US011514906B2

(12) United States Patent
Pawar et al.

(10) Patent No.: US 11,514,906 B2
(45) Date of Patent: Nov. 29, 2022

(54) VOICE ACTIVATED DEVICE WITH INTEGRATED HEATSINK AND SPEAKER

(71) Applicant: Amazon Technologies, Inc., Seattle, WA (US)

(72) Inventors: Amita Pawar, Sunnyvale, CA (US); Jordan Pine, San Jose, CA (US); Albert John Yu Sam Chua, San Jose, CA (US); Yu-Tsen Kuo, Mountain View, CA (US); Thompson Q. Nguyen, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/830,716

(22) Filed: Mar. 26, 2020

(65) Prior Publication Data

US 2021/0304744 A1   Sep. 30, 2021

(51) Int. Cl.
*G10L 15/22* (2006.01)
*F21V 7/04* (2006.01)
(Continued)

(52) U.S. Cl.
CPC .............. *G10L 15/22* (2013.01); *F21V 7/04* (2013.01); *F21V 19/0015* (2013.01);
(Continued)

(58) Field of Classification Search
CPC .......... H04R 1/025; H04R 1/08; H04R 1/403; H04R 1/406; H04R 1/02; H04R 1/028;
(Continued)

(56) References Cited

U.S. PATENT DOCUMENTS

| 9,574,762 B1* | 2/2017 | Grillo ..................... F21V 33/00 |
| 2016/0119459 A1 | 4/2016 | Clementson et al. |

(Continued)

FOREIGN PATENT DOCUMENTS

| CN | 206637340 U | 11/2017 |
| CN | 209201273 | 8/2019 |

(Continued)

OTHER PUBLICATIONS

PCT "International Search Report & Written Opinion" App. No. PCT/US2021/024086 dated Jul. 14, 2021; 21 pages.

(Continued)

*Primary Examiner* — Ahmad F. Matar
*Assistant Examiner* — Sabrina Diaz
(74) *Attorney, Agent, or Firm* — Eversheds Sutherland (US) LLP

(57) ABSTRACT

Systems, methods, and computer-readable media are disclosed for voice activated devices with integrated heatsinks and speakers. In one embodiment, an example voice activated device may include a housing having an upper portion and a lower portion, a speaker housing, a heatsink coupled to the speaker housing, where the heatsink and the speaker housing together form a sealed chamber, a first speaker coupled to the speaker housing and partially disposed within the sealed chamber, where the first speaker is oriented to output audio towards the upper portion of the housing, and a light ring disposed about the lower portion of the housing.

19 Claims, 15 Drawing Sheets

(51) Int. Cl.
*F21V 19/00* (2006.01)
*G04G 21/06* (2010.01)
*H04R 1/02* (2006.01)
*H04R 9/02* (2006.01)
*F21Y 115/10* (2016.01)
*G04G 17/08* (2006.01)

(52) U.S. Cl.
CPC ............... *G04G 21/06* (2013.01); *H04R 1/02* (2013.01); *H04R 9/022* (2013.01); *F21Y 2115/10* (2016.08); *G04G 17/08* (2013.01); *G10L 2015/223* (2013.01); *H04R 2201/025* (2013.01)

(58) Field of Classification Search
CPC .......... H04R 1/26; H04R 1/323; H04R 1/345; H04R 1/342; H04R 1/38; H04R 1/2819; H04R 1/2826; H04R 1/2842; H04R 2201/021; H04R 2201/025; H04R 5/02; H04R 2205/021; H04R 2499/11; H04R 3/12; H04R 9/022; H04R 1/026; H04R 1/021; B60R 11/0217; B60R 2011/0045; H04S 7/40; H04M 1/03; G10L 15/22; G10L 2015/223; F21V 7/04; F21V 19/0015; G04G 21/06; G04G 17/08; F21Y 2115/10

USPC ............ 381/386, 345, 87, 332, 334, 336, 91
See application file for complete search history.

(56) References Cited

U.S. PATENT DOCUMENTS

| | | | |
|---|---|---|---|
| 2017/0126937 A1* | 5/2017 | Evans, V | H04N 5/2254 |
| 2018/0190285 A1* | 7/2018 | Heckmann | G06F 1/20 |
| 2019/0174598 A1* | 6/2019 | Twaddell | H05B 31/50 |
| 2019/0293279 A1 | 9/2019 | Nakatsukasa | |
| 2019/0031317 A1 | 10/2019 | Sunshine et al. | |
| 2019/0394547 A1 | 12/2019 | Lemons et al. | |
| 2020/0053444 A1* | 2/2020 | Kim | H04R 3/12 |
| 2020/0088360 A1 | 3/2020 | Salzinger et al. | |

FOREIGN PATENT DOCUMENTS

| | | | |
|---|---|---|---|
| CN | 209201273 U | 8/2019 | |
| WO | 2021061130 A1 | 4/2021 | |
| WO | WO-2021061130 A1 * | 4/2021 | ............. F21V 13/02 |

OTHER PUBLICATIONS

International Search Report and Written Opinion for PCT Application No. PCT/US2021/024086, dated Jul. 14, 2021, 14 pages.

* cited by examiner

VOICE ACTIVATED DEVICE WITH INTEGRATED HEATSINK AND SPEAKER

BACKGROUND

Electronic devices may have heatsinks, speakers, and other components. Certain devices may include additional components, such as microphones, lighting, and so forth. However, certain devices may have limited footprints or compact sizes. Such form factors may result in poor sound quality due to speaker size and other factors. As a result, devices with reduced footprints and/or smaller form factors and improved sound quality may be desired.

Figure 1A:
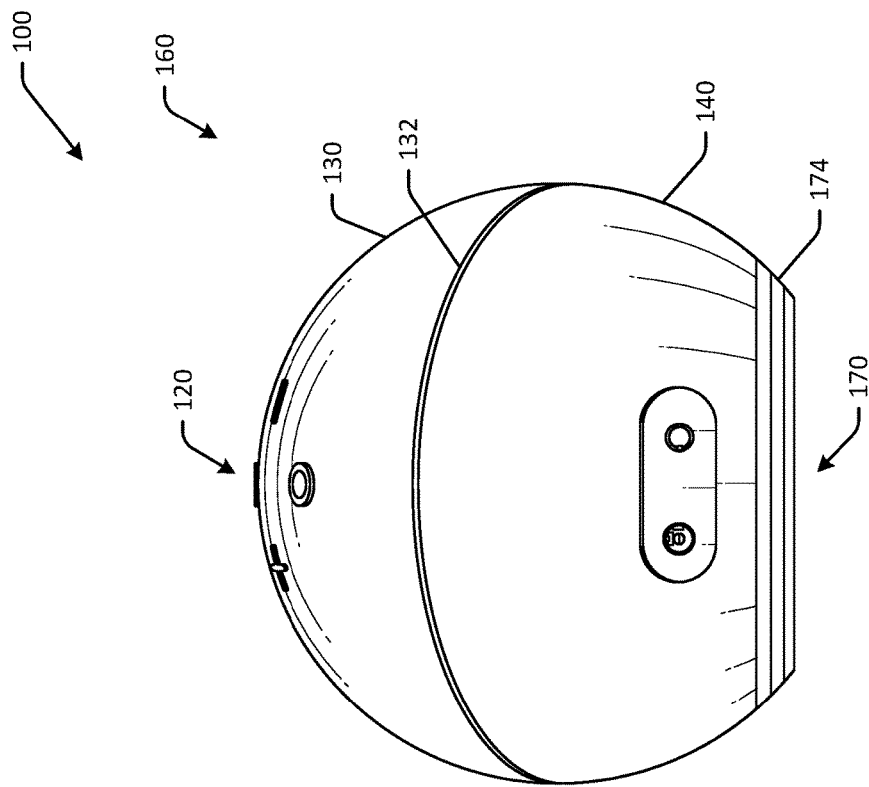
FIGS. 1A-1C are schematic drawings of a voice activated device with integrated heatsink and speaker in various views in accordance with one or more embodiments of the disclosure.
Figure 1A:
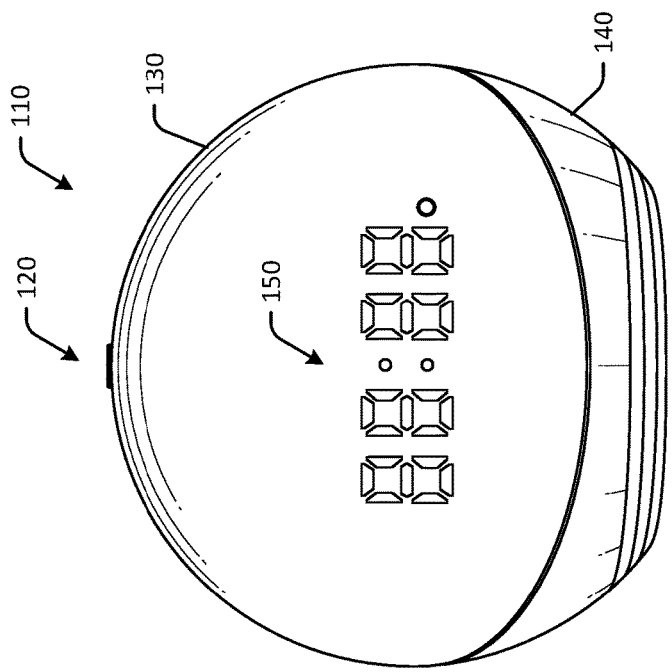

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may encompass, depending on the context, a plural number of such components or elements and vice versa.

DETAILED DESCRIPTION

Overview

Voice activated devices may be devices that users can interact with via voice-based input, such as speech input, as well as other optional input types, such as touch input, buttons, and other inputs. Some voice activated devices may be voice assistant devices. For example, a voice assistant device may be a device that a user can interact with via speech input to perform certain tasks. In an example, a user may audibly speak "Alexa, play my workout playlist." A voice assistant device or other voice activated device may detect the speech input, and may determine a meaning of the speech input. For example, the voice assistant device may detect the speech input using one or more microphones, and may determine a meaning of the speech input in conjunction with one or more voice processing servers. The voice assistant device may provide a response, such as an audible or visual response, using a display and/or speaker coupled to, or otherwise in communication with, the voice assistant device. Certain voice activated devices may be controlled by voice-based commands or may otherwise respond to verbal or audible utterances. In another example, voice activated devices may detect sounds in an ambient environment and may determine that a voice activated is being invoked based on, for example, detection of a wakeword or other trigger. A user may say or utter the wakeword to invoke the voice activated. The voice activated device may detect the wakeword and listen for a request or voice command, and may respond accordingly. For example, the voice activated device may cause one or more operations to be performed, such as controlling other devices (e.g., televisions, lights, radios, thermostats, etc.), may respond with audio or visual information (e.g., weather, news, messages, etc.), and/or may perform different actions in response to a request or command.

Some voice activated devices may have compact form factors or small footprints. For example, a voice activated device that is to be placed on a table may have a limited footprint so as to avoid occupying too much space on the table. As a result, internal space in the device for device components may be limited. For example, an amount of room for speakers, light emitting diodes (LEDs), and other components may be limited. Speaker quality and/or performance (e.g., a range of sound frequency that can be output by a speaker, etc.) may be impacted by an amount of air that can be displaced by a speaker. For example, speakers for which relatively less air can be displaced may have reduced performance relative to speakers for which relatively more air can be displaced. For devices with limited form factors or internal volumes, sound quality and/or speaker performance may be reduced. However, embodiments of the disclosure may include voice activated devices with integrated heatsink and speaker assemblies that provide increased air for displacement, thereby providing improved sound quality and/or speaker performance, while maintaining compact footprints and/or small form factors. In addition, certain embodiments provide improved microphone performance regardless of proximity to speaker driver, such that interference of microphone performance due to vibrations from the speaker driver may be mitigated.

Embodiments of the disclosure may include voice activated devices that are configured to operate in various environments, such as environments with limited space, while maintaining audible and/or visual interaction capabilities with users and providing high quality audio and/or speaker performance. For example, embodiments of the disclosure may be configured to provide audio or sound output while at the same time providing the ability for microphones in close proximity to one or more speakers to detect speech input of a wake word. Some embodiments may include more than one speaker and may therefore generate a "sound stage" experience with stereo sound. As a result, users may be able to distinguish between left and right channel sounds at certain positions about the device. In addition, some embodiments may include ambient light sensors disposed adjacent to one or more clear buttons, such that ambient light sensor measurements can be determined without the need for masking or other features that may be aesthetically undesired, and used to adjust light intensity of one of more LEDs in the device. Due to the positioning of the ambient light sensor(s), the device may retain a sleek aesthetic look without needing paint masks or other openings in an external surface to capture ambient light measurements. Some embodiments may include a light ring disposed at a lower portion, such as at or near a bottom, of the device, where the light ring may provide visual feedback to a user. For example, the light ring may indicate a direction from which speech input is detected to a user. To avoid bright spots or other non-uniform display of lighting, embodiments may include a reflector to evenly distribute light from one or more LEDs.

The techniques, methods, and processes described herein may be used to detect and/or determine voice-based requests or commands, and to initiate actions that may include controlling other electronic devices. For example, certain embodiments may be configured to output signals that control aspects of home entertainment systems, HVAC systems, appliances, and so forth, and may be configured to output audio signals via one or more speakers.

This disclosure relates to, among other things, systems, methods, computer-readable media, techniques, and methodologies for voice activated devices with integrated heatsinks and speakers. Embodiments may include devices that can be voice-controlled and respond to audible instructions, output audio content, control other electronic devices and/or other operations. Some embodiments include a light ring or other visual indicator that can be used to convey certain information to a user, such as a detected location or direction of sound or a sound source, or a detected location of the user that is currently being listened to by the device, as well as device states, such as a listening state, a processing state, a muted or privacy state, and/or other states. As a result, embodiments of the disclosure may be configured to provide audio and/or visual indicators to users in various environments. Certain embodiments may include light ring features or other components that can be used to convey information to users.

Figure 1B:
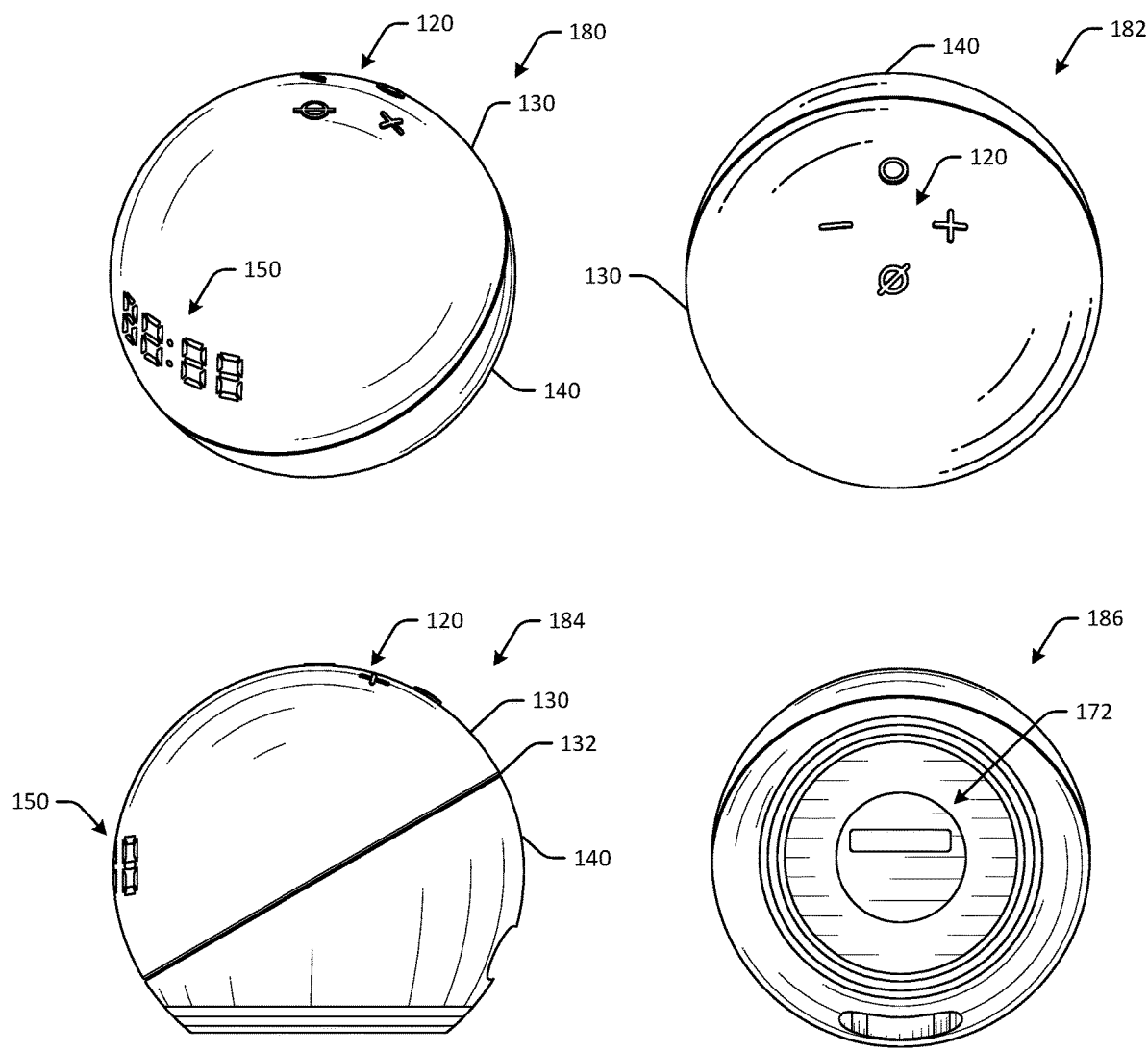
Figure 1C:
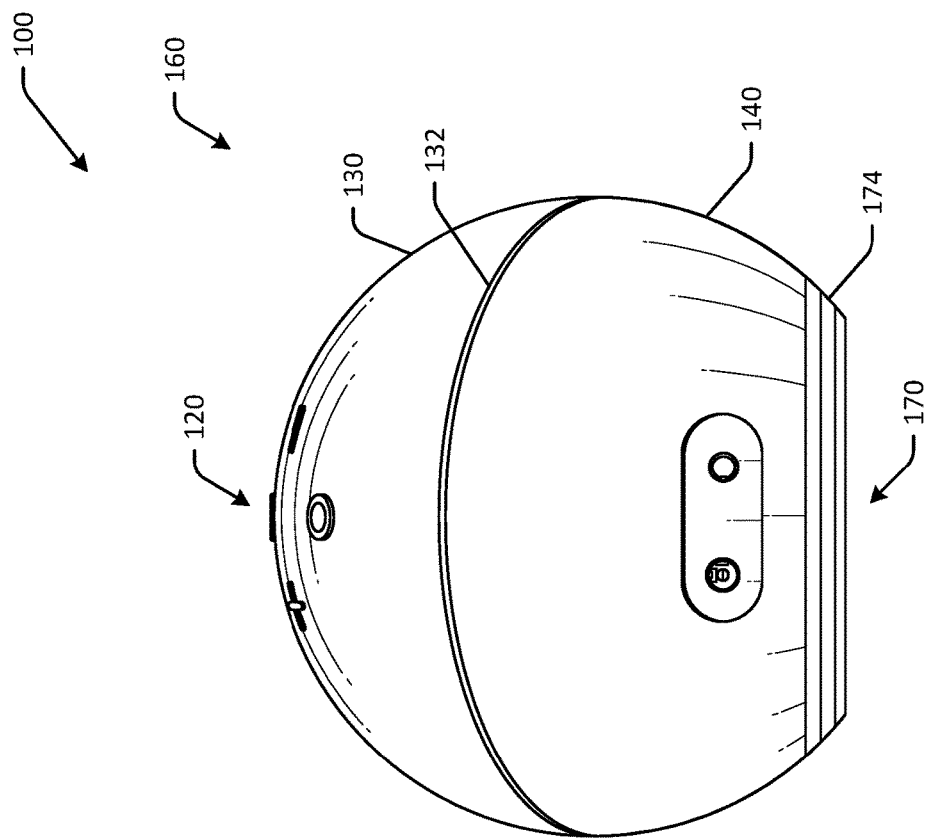
Figure 1C:
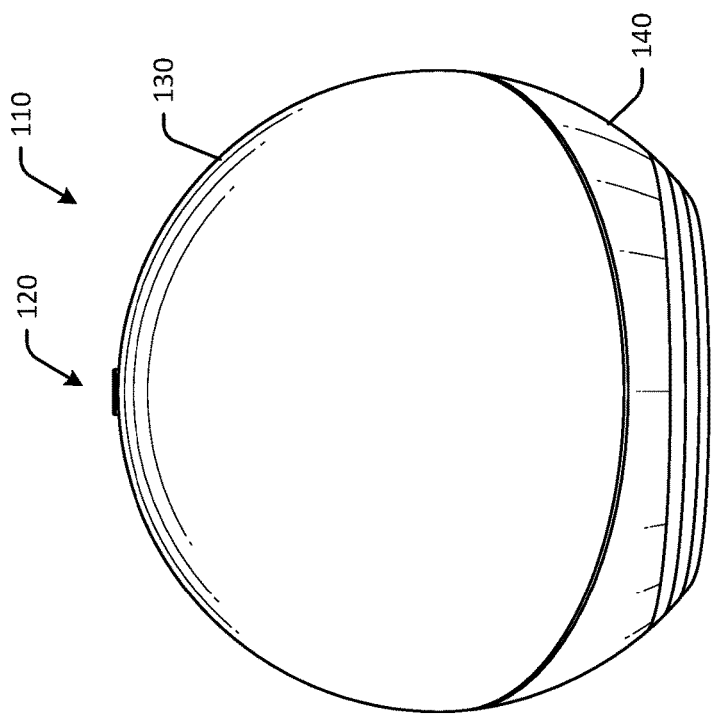

Referring to FIGS. 1A-1C, an example voice activated device 100 is depicted in accordance with one or more embodiments of the disclosure. FIG. 1A depicts the voice activated device 100 in a front view 110 and a rear view 160, and FIG. 1B depicts the voice activated device 100 in a top perspective view 180, a top view 182, a side view 184, and a bottom view 186. FIG. 1C depicts the voice activated device 100 without a clock assembly in a front view 110 and a rear view 160.

As depicted in FIGS. 1A-1C, the voice activated device 100 may include a housing having an upper portion 130 and a lower portion 140. The voice activated device 100 may have a substantially spherical shape or geometry (e.g., a spherical exterior with a flat bottom surface 170, etc.), in an example embodiment. The voice activated device 100 may include a number of buttons 120. Any number of buttons may be included in any arrangement, such as the illustrated diamond arrangement, a linear arrangement, a circular arrangement, or a different arrangement. The buttons may include volume adjustment button(s), action button(s), mute or privacy button(s), and/or other types of buttons. The buttons 120 may be disposed on the upper portion 130 of the housing. In the illustrated embodiment, the buttons 120 may include a volume increase button, a volume decrease button, an action button (e.g., a button used to turn off an alarm, set up WiFi, etc.), and a privacy button that may disable any microphones or cameras at the voice activated device 100. One or more of the buttons 120 may be at least partially clear and/or translucent, such that light can pass through the material forming the button. For example, the privacy button may be translucent such that it can be illuminated red or another color when a privacy mode is active. In another example, the action button may be translucent such that ambient light can pass through a portion of the action button and propagate to an ambient light sensor disposed within the voice activated device 100 for ambient light measurements.

The upper portion 130 and the lower portion 140 may be coupled along a non-horizontal or non-vertical joint 132, relative to the flat bottom 170. For example, as illustrated in FIGS. 1A-1C, the upper portion 130 and the lower portion 140 of the housing may be coupled along an angled or transverse joint relative to the flat bottom 170 of the voice activated device 100.

The voice activated device 100 may include one or more lighting components, such as a light ring disposed about the lower portion 140 of the housing. In some embodiments, the light ring may be a circular light ring component that is disposed at or near a lower or bottom surface of the voice activated device 100 ("top," "bottom," and "side" are used to describe relative and not absolute positioning). In other embodiments, the light ring may not extend fully about the voice activated device 100, and instead may be semicircular, arranged as a series of light emitting diodes (LEDs), and so forth. The light ring may be disposed about an outer surface of the voice activated device 100, such as about the lower portion 140 of the housing.

The voice activated device 100 may include one or more microphones configured to detect sound and/or generate an audio signal. The microphones may be positioned within the housing (e.g., adjacent to or near a top of the voice activated device 100 in an example embodiment, etc.) and may correspond to the locations of one or more microphone holes on the upper portion 130 of the housing. In some embodiments, the voice activated device 100 may include a microphone board with one or more, or a plurality of, microphones. The microphone board may be disposed adjacent to the upper portion 130. In some embodiments, the microphone board may be coupled to the upper portion1 130. The microphone board may include individual microphones arranged or oriented so as to detect sounds from a certain side, such as a "left" side or a right "side" of the voice activated device 100. In some embodiments, the microphones may be arranged in an array, such as four microphones in corners of a rectangle and another microphone in a center of the rectangle. Any number of microphones, such as one, two, three, four, five, and so forth, may be included. As discussed herein, the voice activated device 100 may also include a speaker to output audio.

The buttons 120 of the voice activated device 100 may include one or more pressable or physical buttons. For example, the voice activated device 100 may include smooth buttons or buttons with raised protrusions or raised nub that can be used to locate a particular button by a user without visualizing the particular button. Any number of buttons or manually configurable inputs may be included.

The voice activated device 100 may include one or more connection ports that can be used to create one or more wired or wireless connections. The connection ports may be disposed along the lower portion 140 of the housing. For example, the voice activated device 100 may include an auxiliary connection port, an input and/or output port, a charging or power jack port, and/or other ports. The connection ports may be disposed along a rear surface of the lower portion 140, as illustrated in rear view 160 of FIG. 1A.

The voice activated device 100 may include the light ring 174. The light ring may be a lighting component, such as a circular light ring, that can be used to provide one or more visual indicators. The light ring may be positioned on or near a bottom side of the voice activated device 100 (e.g., bottom relative to the top and sides in this example). The light ring may output light that is visible by users. As described herein, the light ring may allow light emitted from one or more, or a plurality of, top-firing or side-firing LEDs to be visible by users that are external to the voice activated device 100. For example, in FIGS. 1A-1C, a user may be speaking an utterance from the right side of the voice activated device 100. The voice activated device 100 may detect the utterance and may generate a visual indicator using the one or more LEDs, and may indicate the direction from which the utterance is being detected. The user may therefore be aware that the voice activated device is in a listening state.

Because the LEDs may be spread apart from each other, light may typically appear non-uniform when viewed by a user. For example, light may appear brighter in areas where LEDs are located inside the voice activated device 100. To increase light uniformity, embodiments of the disclosure may include a reflector component with a set of sharp features (e.g., saw tooth, triangular, etc.) disposed adjacent to LEDs, and a set of soft features (e.g., gradual curves, etc.) disposed adjacent to the sharp features (e.g., interspersed between the sharp features, etc.) that may direct or guide light emitted by the one or more LEDs, so as to reduce non-uniformity. For example, the light ring may be positioned adjacent to a reflector component disposed within the housing. The reflector component may include various features to guide light to locations that may appear dim relative to other locations.

The light ring may form part of an outer surface of the voice activated device 100. In some embodiments, the light ring may form part of the housing of the voice activated device 100. The light ring may be an optically clear or translucent resin of a light or dark color. Light transmission or translucency of the material may be between about 45% and about 60%, such as about 50%. Translucency of the light bar may be based on a thickness of the light ring.

The voice activated device 100 may have a spherical housing. The spherical housing may include a top portion, such as the upper portion 130, and a bottom portion, such as the lower portion 140. The voice activated device 100 may include an integrated speaker and heatsink assembly, as discussed with respect to FIGS. 2A-2D. The voice activated device 100 may include a microphone board disposed adjacent to the upper portion 130. The microphone board may be a circuit board assembly with a number of components, such as one or more microphones, one or more ambient light sensors, one or more LEDs, and/or other components. The microphones may be arranged in a linear arrangement, an array, a circular arrangement, or a different arrangement, and may be aligned with microphone holes in the upper portion.

The voice activated device 100 may include an optional clock 150 that may form numbers using one or more LEDs of a clock assembly, as discussed with respect to FIGS. 2A-2D. The clock 150 may be disposed at a front of the voice activated device 100, as illustrated in the front view 110 of the voice activated device 100 in some embodiments, whereas in other embodiments, the clock 150 may be disposed at or near a top of the voice activated device 100. The clock 150 may be used to present the time and may include a circular indicator for AM or PM, as illustrated in FIG. 1A. Some embodiments may not include the clock 150 and may therefore have a different upper portion 130. For example, referring to FIG. 1C, the voice activated device 100 may not include the clock 150. As a result, the front of the device may appear blank. In such embodiments, the same upper portion 130 of the housing may be used, whereas in other embodiments, a different upper portion may be used for devices without the clock.

The voice activated device 100 may include a set of LEDs configured to emit light, where the set of LEDs may positioned within the spherical housing. The voice activated device 100 may include a bottom cover 172 coupled to a second side of the lower portion 140, where the bottom cover 172 may be disposed adjacent to circular light ring, such that light emitted from the set of LEDs is visible through the circular light ring. One or more rubber components, such as a rubber base formed of nitrile rubber, may be coupled to the bottom cover 172. The voice activated device 100 may include the flat bottom surface 170 where the upper portion 130 may be coupled to the lower portion 140 along the joint 132 transverse to the flat bottom surface 170.

The integrated speaker and heatsink assembly may include a speaker housing and a heatsink coupled to the speaker housing, where the heatsink and the speaker housing together define a sealed chamber. The integrated speaker and heatsink assembly may include a first speaker coupled to the speaker housing and configured to output sound at a first angle upwards towards the top portion. For example, the first speaker may output sound angled at a non-vertical axis upwards. The heatsink may be curved or may otherwise have a non-planar contour. Any number of speakers may be coupled to the speaker housing.

In some embodiments, a fabric cover may be disposed at least partially over the upper portion 130 and/or the lower portion 140. The fabric cover may provide flexibility with respect to an aesthetic appearance of the voice activated device 100.

The buttons 120 may be a button assembly that is coupled to the upper portion 130. The button assembly may include a set of buttons accessible through the upper portion 130. The set of buttons may include a first translucent button operable to control a function of the voice activated device 100, such as an action button, and a second translucent button operable to disable the plurality of microphones, such as a privacy or mute button. The button assembly may include a first plastic light pipe disposed between the first translucent button and the ambient light sensor, such that the first plastic light pipe guides light from an ambient environment to the ambient light sensors. The first plastic light pipe may be a light guide or other component configured to draw light from one area to another. Light pipes may be made of optical acrylic, polycarbonate, or other material and may transmit light from one area to another, such as from a light source to another location. As a result, the ambient light sensor may be configured to determine ambient levels without directly being exposed to an ambient environment. The button assembly may include a second plastic light pipe disposed between the second translucent button and the LED on the microphone board. For example, the LED may be a red-colored LED, and the second plastic light pipe may be configured to guide light emitted by the red LED to the second translucent button, so as to illuminate the button when the LED is active.

Users may verbally interact with the voice activated device 100 to control the voice activated device 100, as well as to optionally control other electronic devices in the ambient environment. The voice activated device 100 may detect the audible sound from a user and may determine a meaning of the sound. For example, the voice activated device 100 may detect a trigger word or a wakeword of "Alexa," or another trigger word, and may subsequently begin monitoring for voice commands using one or more microphones. In some embodiments, detection and/or processing of voice data or voice commands may be done locally at the voice activated device 100, while in other embodiments the voice activated device 100 may communicate with one or more servers to determine a meaning of a voice command In some embodiments, the trigger word may be detected and determined locally, while voice commands may be processed remotely. After determining or receiving the meaning of the user utterance, the voice activated device 100 may initiate one or more response actions.

Certain embodiments may include integrated heatsinks and speakers or speaker assemblies, such as metal heatsinks and plastic speaker assemblies, thereby increased a compactness of the voice activated device and reducing a footprint and/or form factor of the voice activated device. As a result, embodiments of the disclosure may be used in environments with limited space, yet may provide visual and audible indications to users that can be heard or seen from various positions.

Example embodiments of the disclosure provide a number of technical features or technical effects. For example, in accordance with example embodiments of the disclosure, certain embodiments of the disclosure may increase a visibility of light visible in lighting elements, control multiple electronic devices and/or vehicle control systems, detect voice commands, determine meanings of voice commands, and/or initiate actions in response to voice commands. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

FIGS. 2A-2D schematically depict the voice activated device 100 of FIGS. 1A-1B in an exploded view 200 and other views in accordance with one or more embodiments of the disclosure. Other embodiments may include additional or fewer, and/or different, components. Some embodiments may not include certain components, such as clocks, fabric covers, and so forth, whereas other embodiments may include certain components, such as additional speakers, relative to the single speaker illustrated in FIGS. 2A-2D.

In FIGS. 2A-2D, the voice activated device may include the housing having the upper portion 130 and the lower portion 140. The lower portion 140 may have a curved side surface, as depicted in FIGS. 2A-2D. In some embodiments, the voice activated device 100 may include a fabric cover that may be disposed about the upper portion 130 of the housing. The fabric cover may provide aesthetic appeal or additional functionality, such as a tactile grip for the voice activated device 100. The lower portion 140 and/or the upper portion 130 may have a hemispherical geometry, and the voice activated device 100 may have a substantially spherical geometry.

The voice activated device may include a speaker housing 220, and a heatsink 222 coupled to the speaker housing 220. The heatsink 222 and the speaker housing 220 may together form a sealed chamber that provides air to act as a speaker back volume. The voice activated device may include a first speaker 224 coupled to the speaker housing 220. The first speaker 224 may be at least partially disposed within the sealed chamber. The first speaker 224 may be oriented to output audio towards the upper portion 130 of the housing. For example, the first speaker 224 may have a central axis 228 disposed through a center of the magnet of the first speaker 224. The central axis 228 may form an upward angle relative to horizontal of between about 5 degrees and about 90 degrees, such as about 65 degrees. The upper portion 130 may include one or more apertures to allow sound from the first speaker 224 to pass through the upper portion 130. A seal 226 may be disposed about a perimeter of the first speaker 224 and may be positioned between the speaker housing 220 and the upper portion 130. The seal 226 may be a foam, adhesive, tape, or other type of seal, and may mitigate vibration generated by the first speaker 224 from reaching one or more microphones of the voice activated device. The speaker housing 220 may be formed of plastic and the heatsink 222 may be formed of metal, such as aluminum.

Figure 2A:
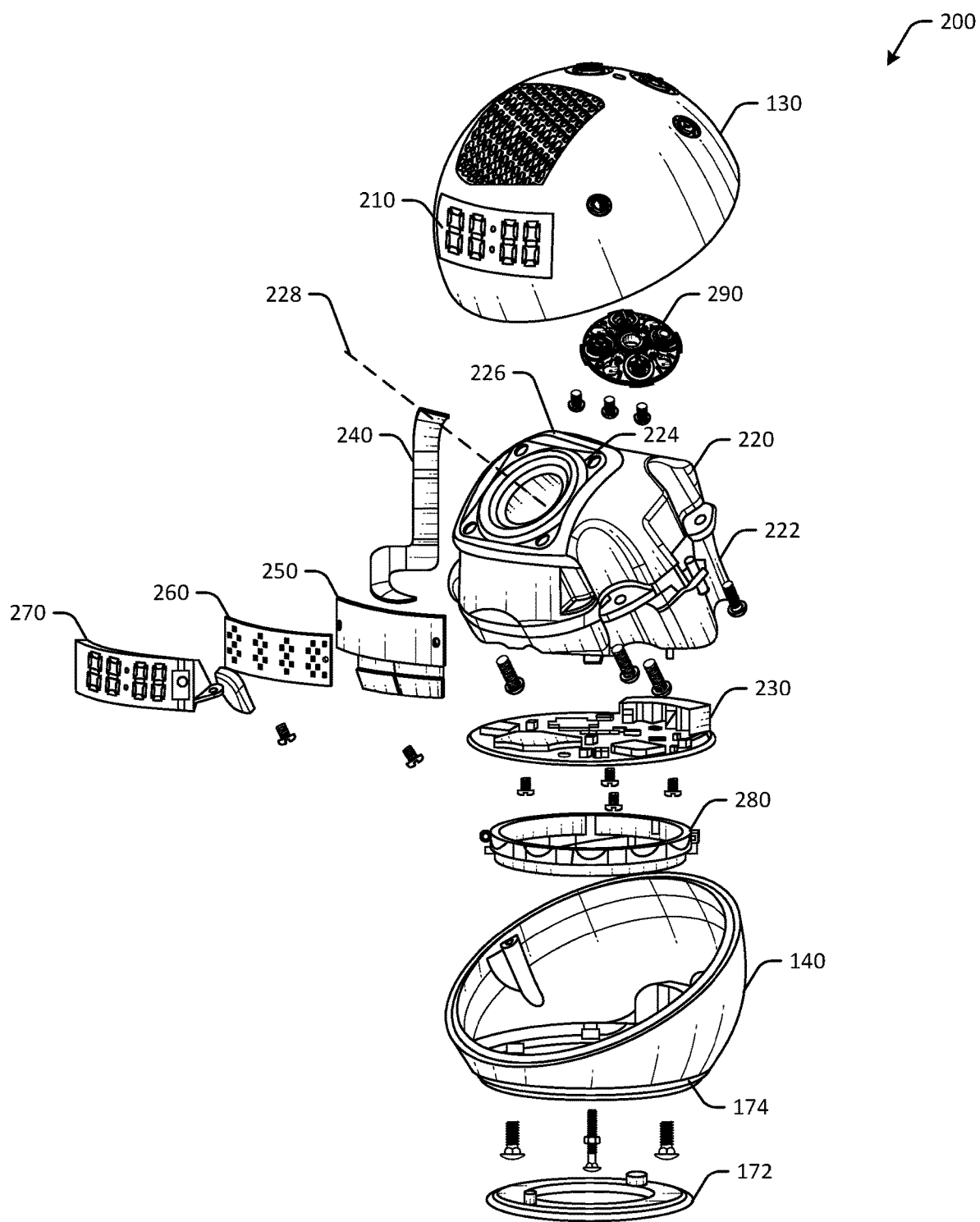
FIGS. 2A-2D are schematic drawings of the voice activated device of FIGS. 1A-1C in various views in accordance with one or more embodiments of the disclosure.
Figure 2B:
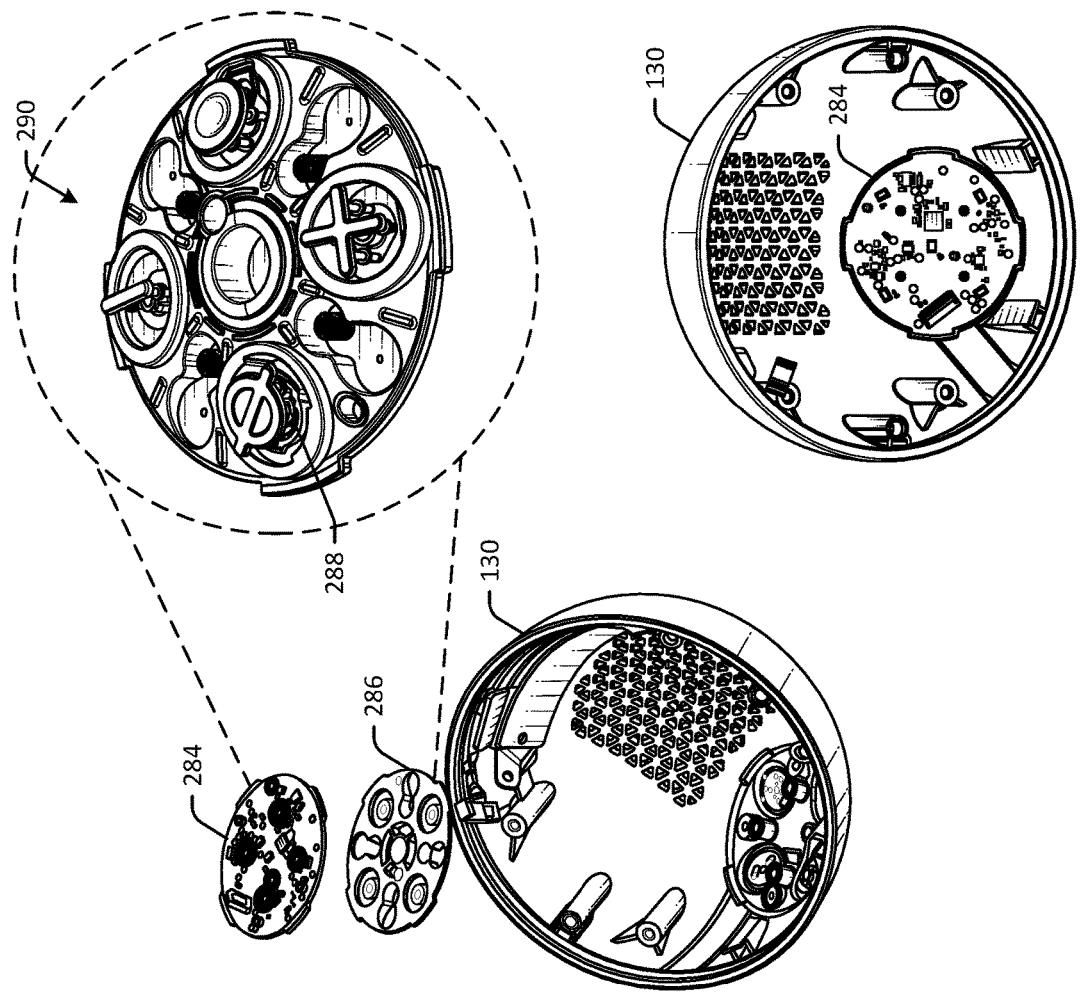
Figure 2B:
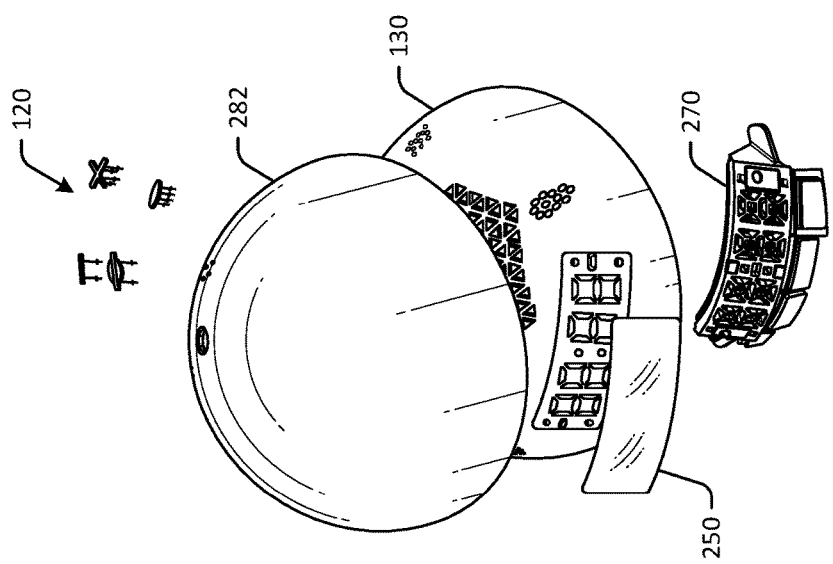
Figure 2C:
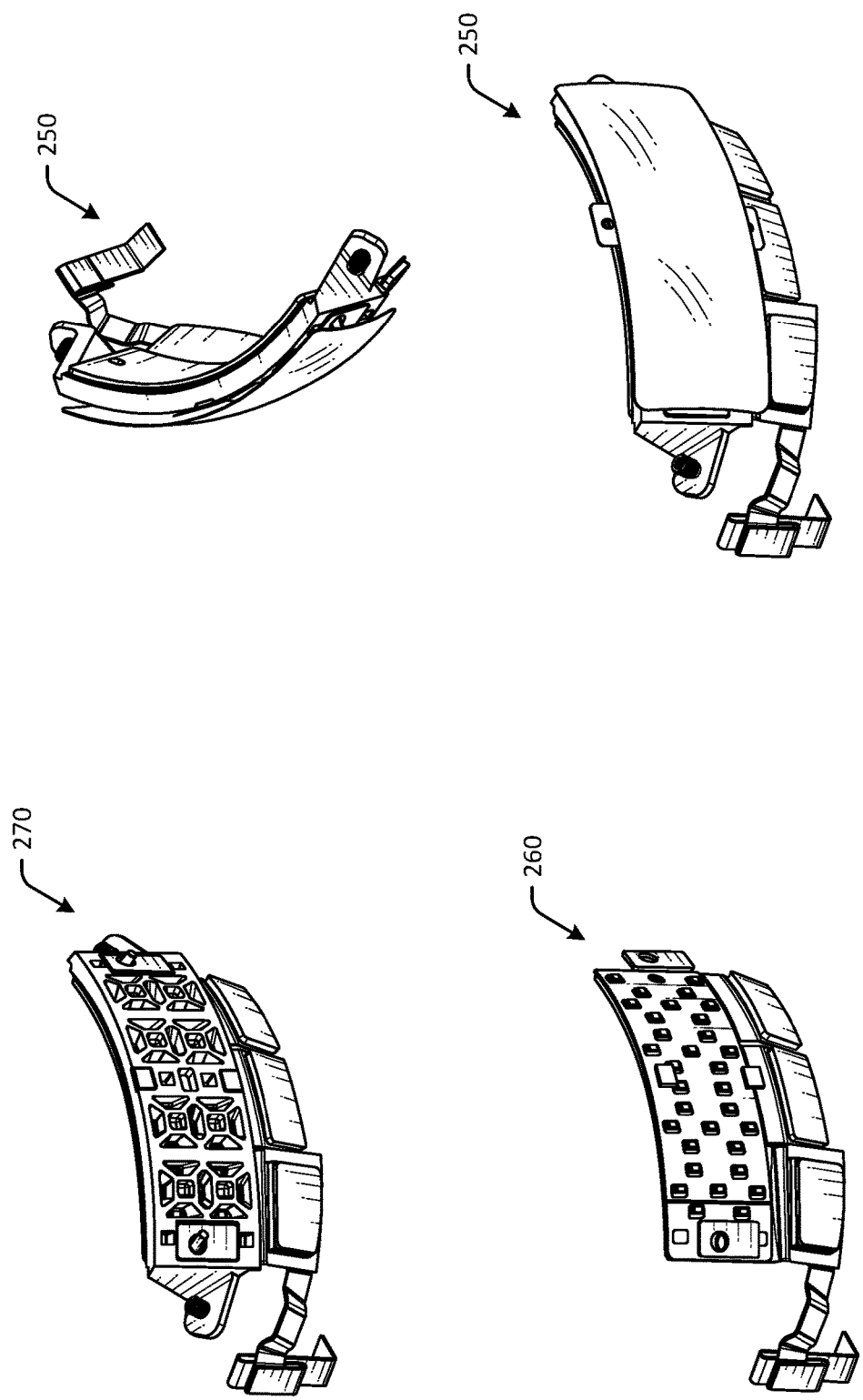

As illustrated in FIG. 2B, the voice activated device may include a microphone board 284, which may be a printed circuit board, and may be disposed adjacent to the upper portion 130. The microphone board 284 may include at least one microphone, at least one LED (e.g., a red-colored LED or other colored LED, etc.), and may include an ambient light sensor disposed thereon. The microphone board 284 may be disposed adjacent to the upper portion 130 of the housing. In some embodiments, the microphone board 284 may be coupled to the upper portion 130. For example, as illustrated in the bottom perspective view of FIG. 2B, the microphone board 284 may be coupled to a button pad 286 to form an assembly 290, and the assembly 290 may be coupled to the upper portion 130. The button pad 286 may include one or more light pipes 288 that may be used to guide light into and/or out of the device.

Figure 2D:
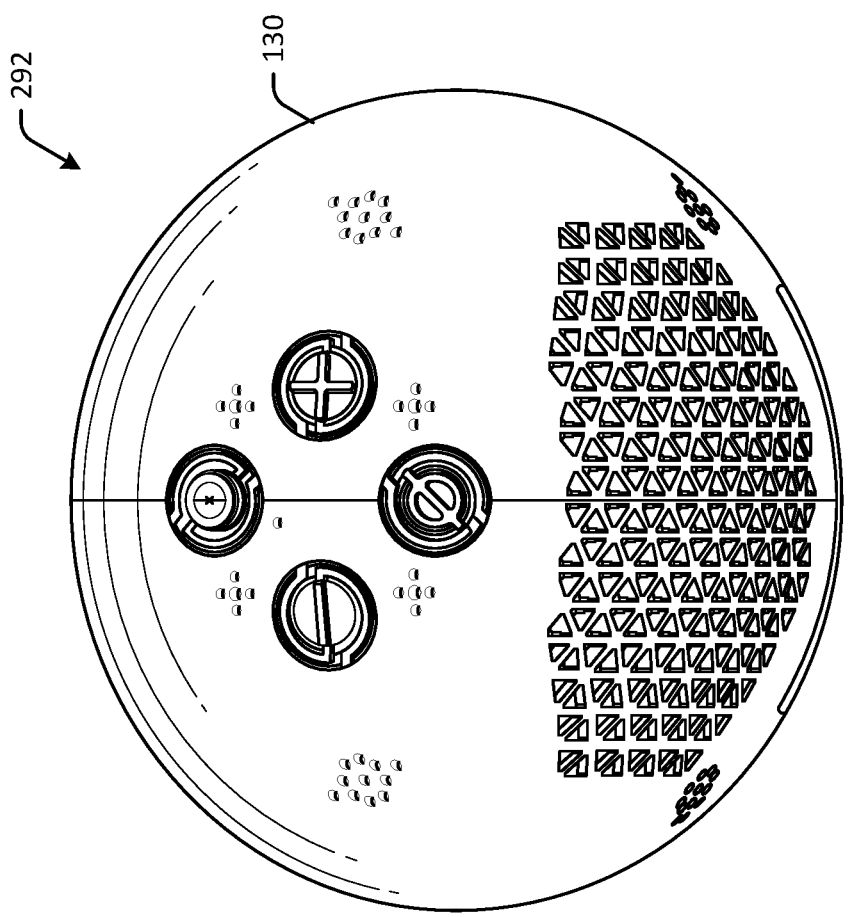

In FIG. 2B, the voice activated device may include a set of one or more buttons 120 accessible through the upper portion 130 and an optional fabric covering 282 that may be disposed at least partially about the upper portion 130 and/or the lower portion of the voice activated device. The set of buttons may include a first button and a second button. The set of buttons may be formed at least partially of plastic and/or rubber, and may be coupled to an inner surface of the upper portion 130. In FIG. 2D, the upper portion 130 is depicted in a top view 292 without a fabric covering, and the upper portion 130 may include openings aligned with the speaker to facilitate sound output from the speaker leaving the device.

One or more of the buttons may be optically transmissive or otherwise translucent. The ambient light sensor may be optically coupled to the translucent button. A first light guide component, such as a light pipe, may be disposed between the first button and the ambient light sensor, such that ambient light propagates to the ambient light sensor to determine ambient light measurements. An intensity of a light ring may be adjusted based at least in part on ambient light measurements.

A second light guide component may be disposed between another translucent button and the at least one LED on the microphone board. For example, the at least one LED may be a red-colored LED, and the second light guide component may be configured to guide light emitted by the LED to the translucent button, such that the button is illuminated. As a result, a user can visibly see when a certain device mode, such as a privacy mode, is active.

The upper portion 130 and/or the lower portion 140 of the housing may be optionally covered with a fabric covering. The fabric covering may be at least partially translucent. In some embodiments, instead of being coupled to a translucent button, the ambient light sensor may be optically coupled to an opening in the upper portion 130 that may be covered by a fabric covering. For example, the first light guide component may be disposed between an opening in the upper portion 130 and the ambient light sensor. The ambient light sensor may therefore measure ambient light propagating though the fabric cover and the first light guide component. In some embodiments, the first light guide component may extend between the fabric cover and the ambient light sensor, such that the first light guide component is in contact with the fabric cover and the ambient light sensor. In such instances, the fabric cover may have a certain type of weave and/or may be formed of certain fabric colors to avoid absorbing ambient light.

For example, the voice activated device may include a plastic light pipe (e.g., light pipe 288 in FIG. 2B) disposed between the fabric covering and the ambient light sensor, where the plastic light pipe is configured to guide ambient light that propagates the fabric covering from an ambient environment to the ambient light sensor. The fabric may therefore include at least a portion through which light is transmissible. The plastic light pipe may be disposed in a vertical orientation or other orientation inside the spherical housing, so as to receive ambient light from a top or near a top of the voice activated device.

A circuit board 230 may be disposed adjacent to a lower surface of the lower portion 140 and/or may be coupled to a lower surface of the heatsink 222. The circuit board 230 may be a main logic board and may include one or more LEDs configured to output light to illuminate the light ring 174. One or more thermal pads and/or shields, such as WiFi shields may be disposed on the main login board and may be positioned between the main login board and the heatsink. The light ring 174 may be disposed about the lower portion 140 of the housing. A light reflector component 280 may be disposed adjacent to the circuit board 230 and/or the lower surface of the lower portion 140. The bottom cover 172 may be coupled to the lower portion 140, and may include one or more rubber feet or other gripping components. The light reflector component 280 may be disposed between the main logic board or circuit board 230 and the lower portion 140. The light reflector component 280 may be configured to reflect light emitted by the LEDs of the circuit board 230. Light emitted from the set of LEDs may be visible through the light ring 174. The light reflector component 280 may be disposed adjacent to the main circuit board 230. The light reflector component 280 may be configured to reflect light and may be configured to direct, reflect, or guide light emitted from one or more LEDs disposed on the main circuit board 230. The light reflector component 280 may be circular and may include a circular perimeter. The light reflector component 280 is illustrated in detail in FIG. 9.

The voice activated device may include an optional clock 210. The clock 210 may be formed of an LED clock assembly coupled to the upper portion 130 of the housing. For example, the LED clock assembly may be disposed at a side of the housing, and may be positioned closer to a bottom of the voice activated device than the first speaker 220. The LED clock assembly may include a mounting bracket 250, a set of LEDs 260, and a display 270. The mounting bracket 250 may be a white bracket, such that light generated by the LEDs 260 reflects from the mounting bracket 250 and out of the device, thereby improving visibility of the clock 210. The LEDs 260 may be arranged in an order to generate various number features to form time values. The display 270 may cover the LEDs 260 and may form a front surface of the clock assembly. A jumper flex 240 may couple the microphone board to the circuit board 230, and may optionally couple the circuit board 230 to the clock 230. The LED clock assembly is illustrated with isolated components in FIG. 2C. In particular, the mounting bracket 250 is depicted in front and rear perspective views, and may be a curved plastic component and may have a bright white or other light-colored coating to improve reflectivity. The set of LEDs 260 may be coupled to a jumper flex, and the display 270 may be used to output alphanumeric text.

Figure 3:
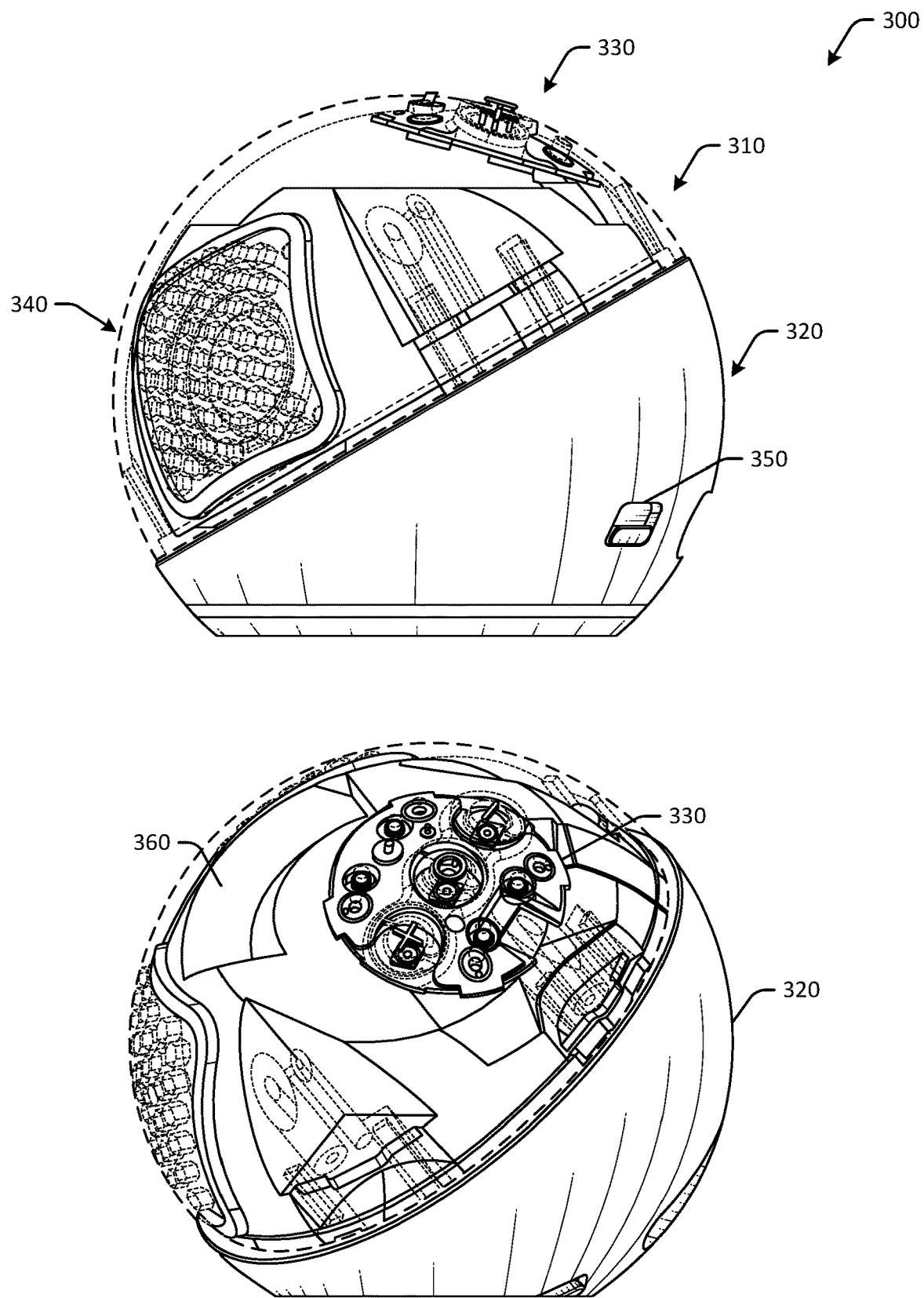
FIGS. 3-4 are schematic drawings of a voice activated device with two speakers and a transparent upper portion in accordance with one or more embodiments of the disclosure.
Figure 4:
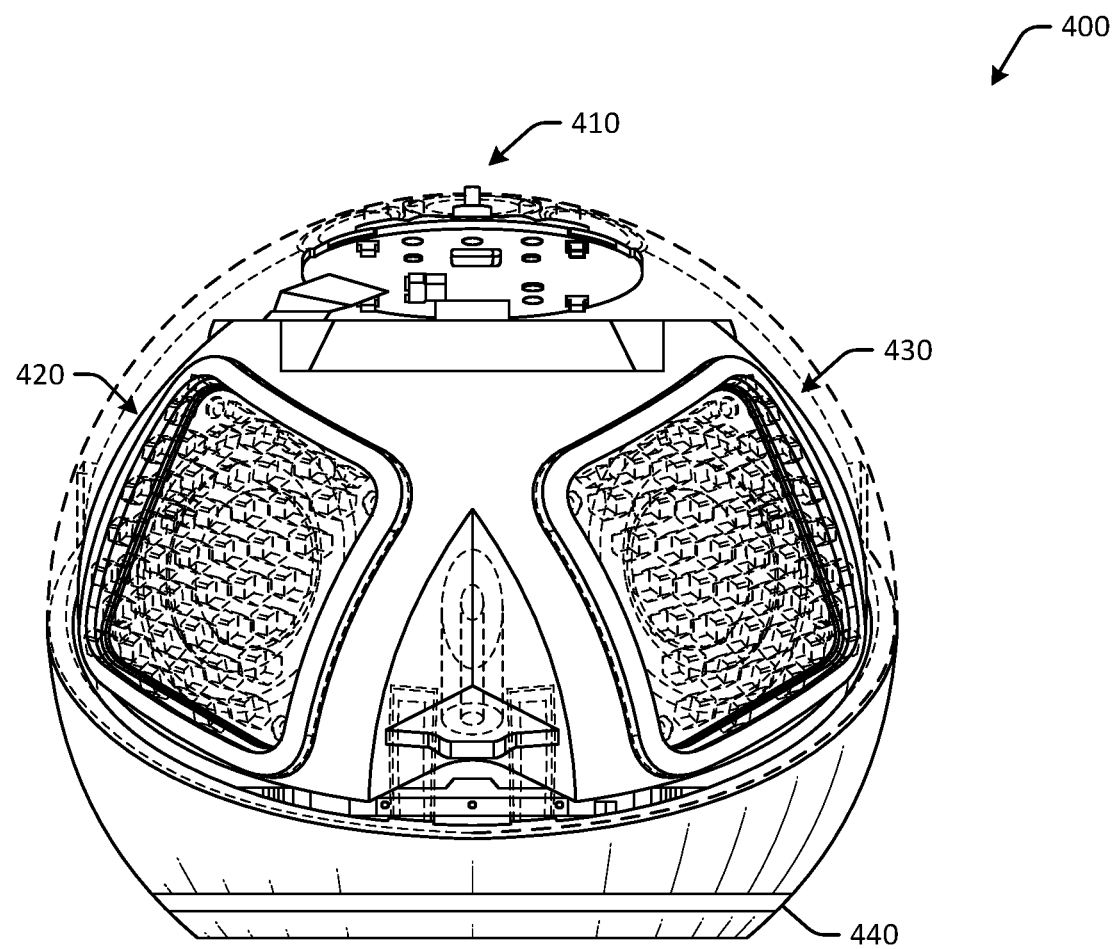

FIGS. 3-4 are schematic drawings of a voice activated device with two speakers and a transparent upper portion in accordance with one or more embodiments of the disclosure. In embodiments with more than one speaker, an optional clock may be included. However, unlike the clock of the embodiments illustrated in FIGS. 1A-2D, the clock may be disposed closer to a top of the voice activated device, such that the clock is angled upwards. As a result, the speakers may be angled relatively more forward or in a lateral direction relative to the upward facing angle of the speaker in FIGS. 1A-2D. FIGS. 3-4 will be discussed in conjunction with each other.

FIG. 3 is a schematic drawing of a voice activated device 300 with two speakers and a transparent upper portion in accordance with one or more embodiments of the disclosure. Other embodiments may include additional or fewer, and/or different, components.

In FIG. 3, the voice activated device 300 may include a housing having an upper portion 310 coupled to a lower portion 320. Although the upper portion 310 is illustrated as being transparent, in other embodiments the upper portion 310 may not be transparent. The voice activated device 300 may include a button assembly 330 with one or more buttons. However, the button assembly 330 may not include a mute button. Instead, a mute switch or a privacy switch 350 may be used to activate a privacy mode at the voice activated device 300. In the embodiment illustrated in FIG. 3, a surface 360 may be empty, where in other embodiments, an optional clock may be disposed. The voice activated device 300 may include two speakers 340. Other embodiments may include additional speakers.

The button assembly 330 may be coupled to a microphone board. Buttons of the button assembly 330 may be accessible externally relative to the interior of the device. For example, a user may press or otherwise engage with one or more of the button assembly 330 (e.g., the buttons may be formed by the button assembly 330, etc.). In other embodiments, the button assembly 330 may be formed of a different material, such as plastic. The button assembly 330 may include at least one button formed of a translucent material, such that light can propagate through the button. An ambient light sensor may be disposed on the microphone board adjacent to the translucent button. The ambient light sensor may be configured to determine ambient light levels or measurements, which may be used to modify intensity of LEDs that illuminate a light ring at a bottom of the device. The microphone board may be coupled to the upper portion 310. The microphone board may include one or more microphones. For example, the microphone board may include two or more microphones, such as five microphones. The microphones may be disposed between the microphone board and the upper portion 310. Other embodiments may include different components and/or different configurations.

FIG. 4 depicts a voice activated device 400 in a front view. The voice activated device 400 may be the same voice activated device 300 as FIG. 3. As illustrated in FIG. 4, there may not be any clock disposed between a button assembly 410 and the speakers. Specifically, the voice activated device 400 may include a first speaker 420 and a second speaker 430. The first speaker 420 and the second speaker 430 may be configured to output stereo sound. In instances where the voice activated device 400 includes more than one speaker, the sealed chamber formed by the integrated speaker housing and heatsink assembly may be divided, so as to provide back volume for each of the speakers. The first speaker 420 and the second speaker 430 may be angled at an upwards angle of between about 2 degrees and about 30 degrees, such as about 5 degrees. Central axes of the respective first speaker 420 and the second speaker 430 may be separated by between about 60 degrees and about 180 degrees, such as between about 75 degrees and about 100 degrees (e.g., about 90 degrees, etc.), which may improve sound output coverage. The first speaker 420 and the second speaker 430 may include a light ring 440 disposed about a lower portion of the first speaker 420 and the second speaker 430.

The second speaker 430 may be coupled to the speaker housing. The first speaker 420 may be oriented along a first axis and the second speaker 430 may be oriented along a second axis. An angular distance between the first axis and the second axis may be between about 75 degrees and about 95 degrees.

Accordingly, the voice activated device 400 may include an integrated speaker and heatsink assembly further having the first speaker 420 coupled to a speaker housing, and the second speaker 430 coupled to the speaker housing and disposed adjacent to the first speaker 420. The second speaker 430 may be configured to output sound at the first angle upwards towards the upper portion of the housing. An angle between a first central axis of the first speaker 420 and a second central axis of the second speaker 430 may be between about 80 degrees and about 95 degrees, and the first angle may be upwards relative to a horizontal axis and may be between about 2 degrees and about 60 degrees, such as about 10 degrees.

FIGS. 5-8 are schematic drawings of a voice activated device 500 having a clock and in various views in accordance with one or more embodiments of the disclosure. The embodiments illustrated in FIGS. 5-8 have two speakers in accordance with one or more embodiments of the disclosure. In embodiments with more than one speaker, an optional clock may be included. However, unlike the clock of the embodiments illustrated in FIGS. 1A-2, the clock may be disposed closer to a top of the voice activated device, such that the clock is angled upwards. As a result, the speakers may be angled relatively more forward or in a lateral direction relative to the upward facing angle of the speaker in FIGS. 1A-2. FIGS. 5-8 will be discussed in conjunction with each other.

Figure 5:
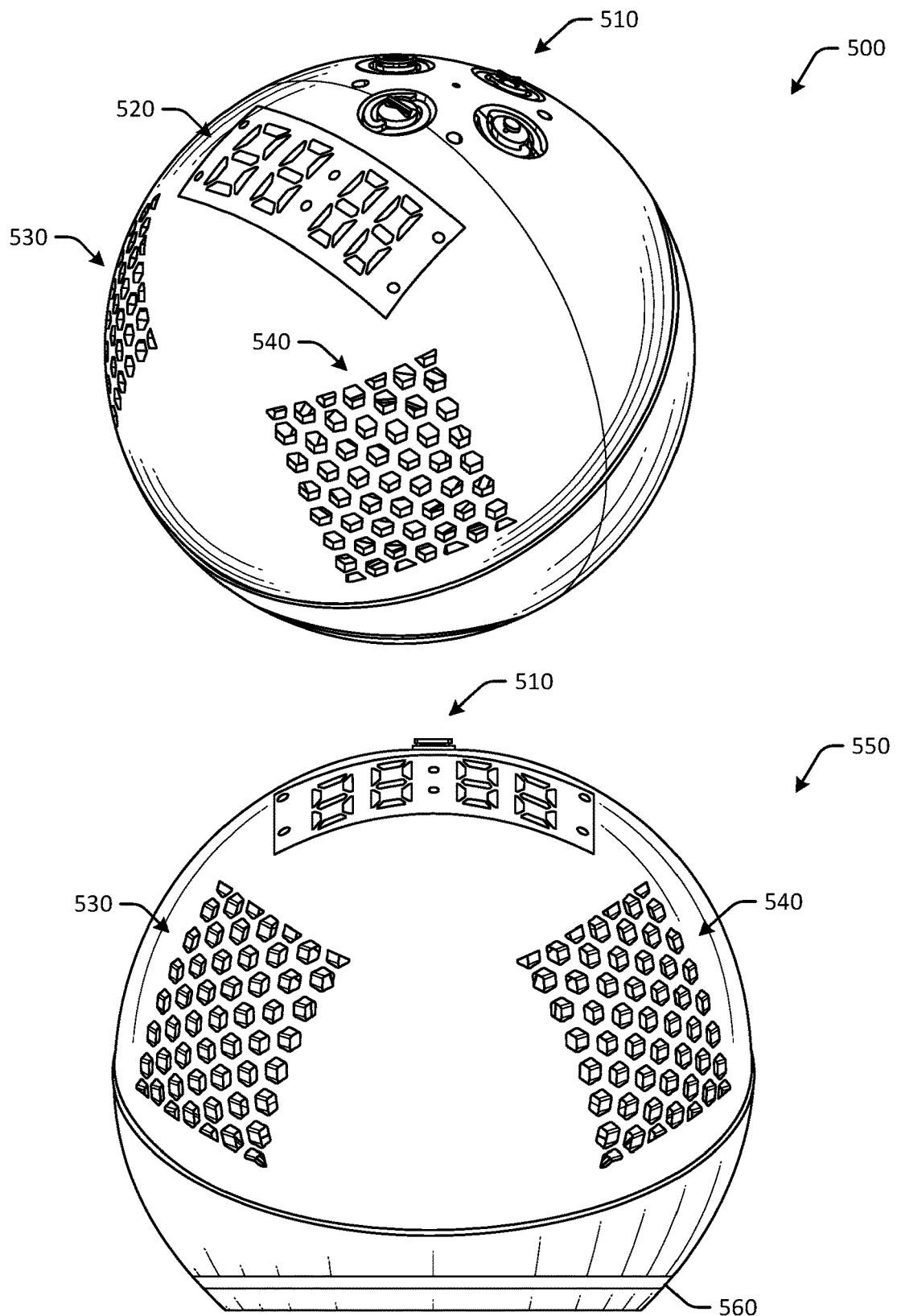
FIGS. 5-8 are schematic drawings of a voice activated device having a clock in various views in accordance with one or more embodiments of the disclosure.

In FIG. 5, the voice activated device 500 is depicted in a top perspective view and a front view. The voice activated device 500 may include one or more buttons 510, a clock 520, a first speaker 530 aligned with first openings in an upper portion of a housing of the voice activated device 500, and a second speaker 540 aligned with second openings in the upper portion of the housing of the voice activated device 500. The voice activated device 500 may include a light ring 560 that may extend at least partially about a base of the voice activated device 500. Other embodiments may include additional or fewer, and/or different, components.

The buttons 510 may be accessible through the upper portion of the housing, and may include a first button and a second button. The voice activated device 500 may include a first light guide component disposed between the first button and an ambient light sensor disposed in the voice activated device 500, and may include a second light guide component disposed between the second button and the at least one LED that may be disposed in the voice activated device 500 at a microphone board or elsewhere.

The first speaker 530 may be angled or oriented at a first orientation, and the second speaker 540 may be oriented at a second orientation. An angular distance between the first orientation and the second orientation may be between about 60 degrees and about 180 degrees, such as between about 75 degrees and about 100 degrees (e.g., about 90 degrees, etc.). The angular distance may be a measure between a first central axis of the first speaker 530 determined along its cone and magnet and a second central axis of the second speaker 540 determined along its cone and magnet. The angular distance may be the angle between the first central axis and the second central axis. Foam layers may be disposed about the respective first speaker 530 and the second speaker 540. The first speaker 530 and the second speaker 540 may be disposed adjacent to the upper portion, so as to limit an air gap between the first speaker 530 and the second speaker 540 and the upper portion, thereby resulting in improved sound. The first speaker 530 and the second speaker 540 may be used to provide stereo sound output. For example, one of the first speaker 530 and the second speaker 540 may present right side channel audio and the other of the first speaker 530 and the second speaker 540 may present left side channel audio. A user standing between the first speaker 530 and the second speaker 540 may be able to determine which speaker certain audio frequencies are being presented.

Figure 6:
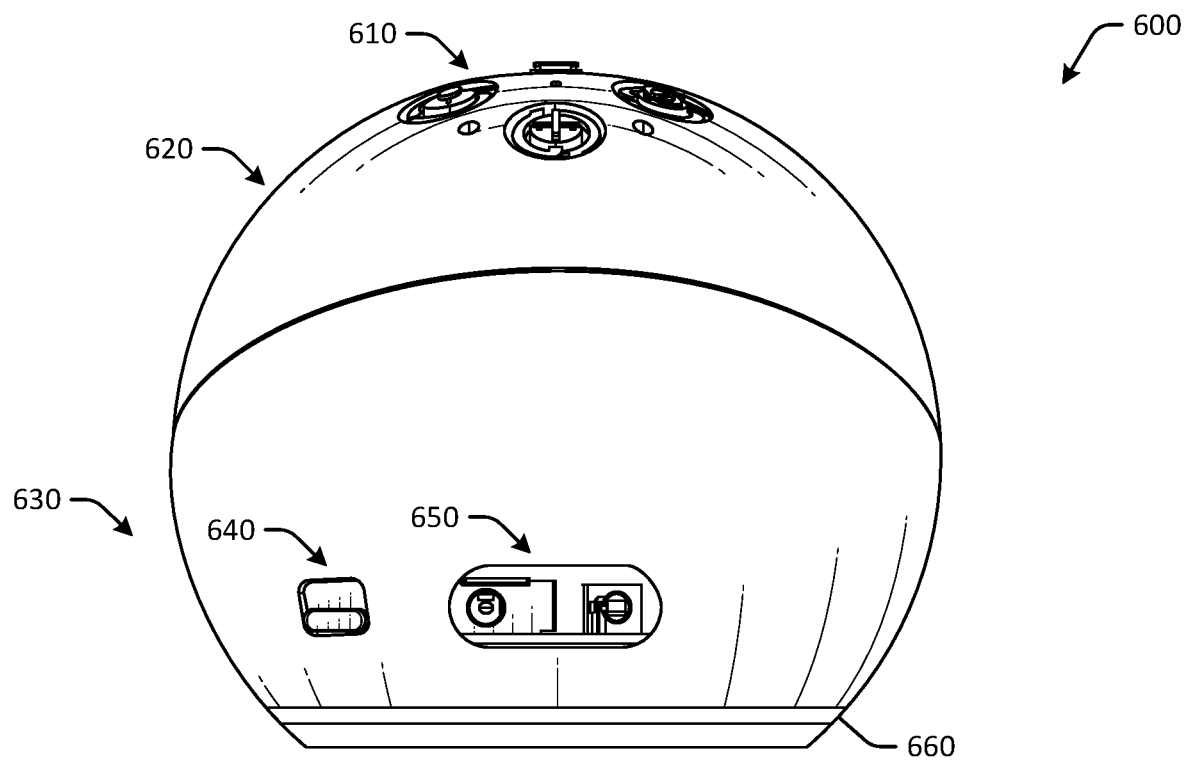
Figure 6:
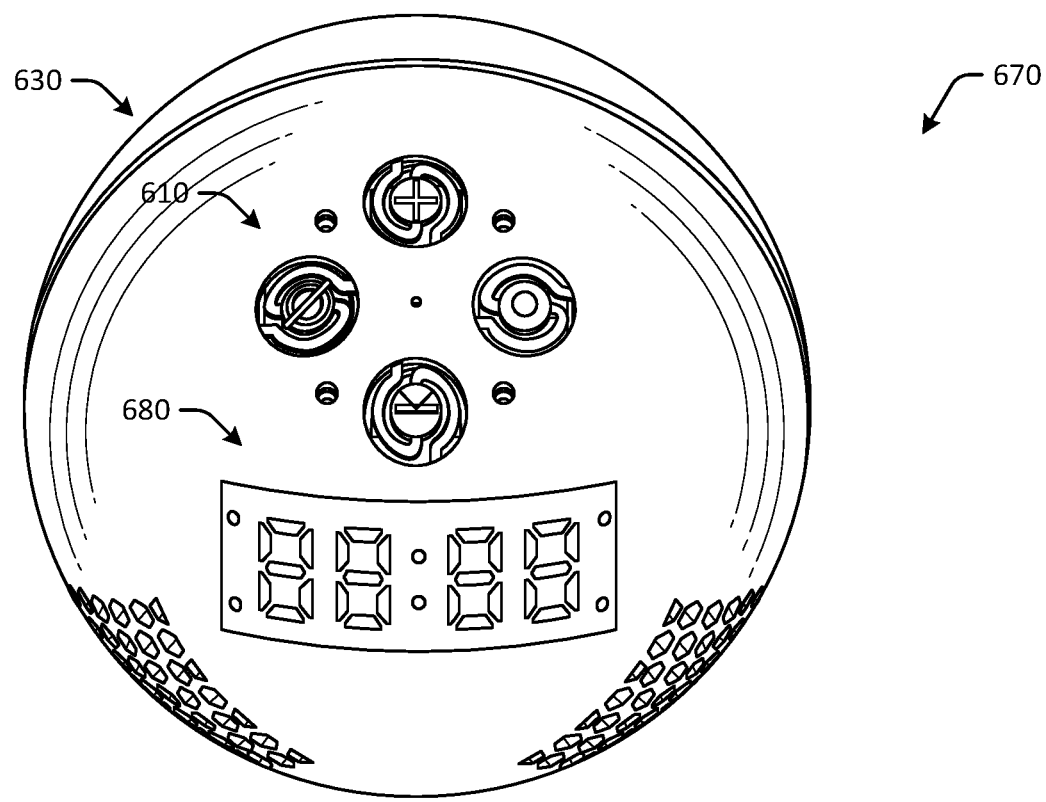

FIG. 6 is a schematic drawing of a voice activated device 600 in a rear view and a top view 670 in accordance with one or more embodiments of the disclosure. The voice activated device may be the same or different than the voice activated device of FIG. 5. Other embodiments may include additional or fewer, and/or different, components.

In FIG. 6, the voice activated device 600 may include a button assembly 610 disposed near a top portion 620 of the voice activated device. The voice activated device 600 may include a physical mute switch 640 that can be used to disable one or more microphones of the voice activated device 600. A light ring 660 may extend about a rear of the voice activated device 600. A number of ports 650 may be disposed along a rear surface of a lower portion 630 of the voice activated device 600. As illustrated in the top view 670, the voice activated device 600 may include a clock 680 that may be disposed at or near a top of the voice activated device 600. The clock 680 may be slightly offset from a center of the top of the voice activated device 600. The clock 680 may be disposed adjacent to the button assembly 610.

Figure 7:
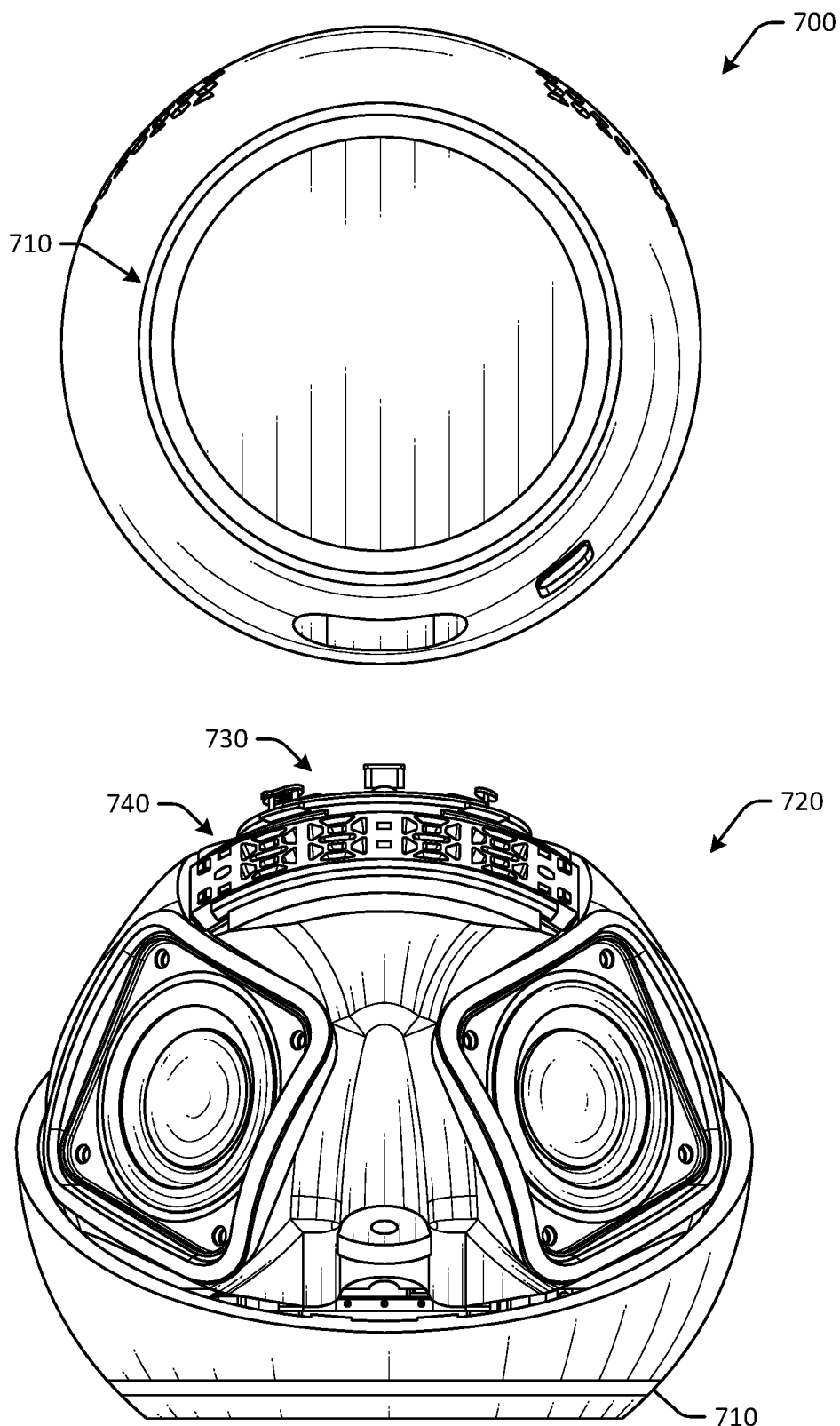

FIG. 7 is a schematic drawing of a voice activated device 700 in a bottom view and a front view 720 without an upper portion in accordance with one or more embodiments of the disclosure. The voice activated device may be the same or different than the voice activated device of FIG. 6. Other embodiments may include additional or fewer, and/or different, components.

In FIG. 7, the voice activated device 700 may include a rubber foot or other rubber component 710 disposed at a bottom of the voice activated device 700. The rubber component 710 may be formed of a nitrile rubber material so as to avoid damage to wooden surfaces. The voice activated device 700 may include a light 750 that may extend about a front of the voice activated device 700. A clock 740 may be disposed at an upper portion of the voice activated device 700, and may be positioned adjacent to a button assembly 730. As illustrated in the front view 720, the voice activated device 700 may include the clock 740 that may be disposed at or near a top of the voice activated device 700. The clock 740 may be slightly offset from a center of the top of the voice activated device 700. The clock 740 may be disposed adjacent to the button assembly 730.

Figure 8:
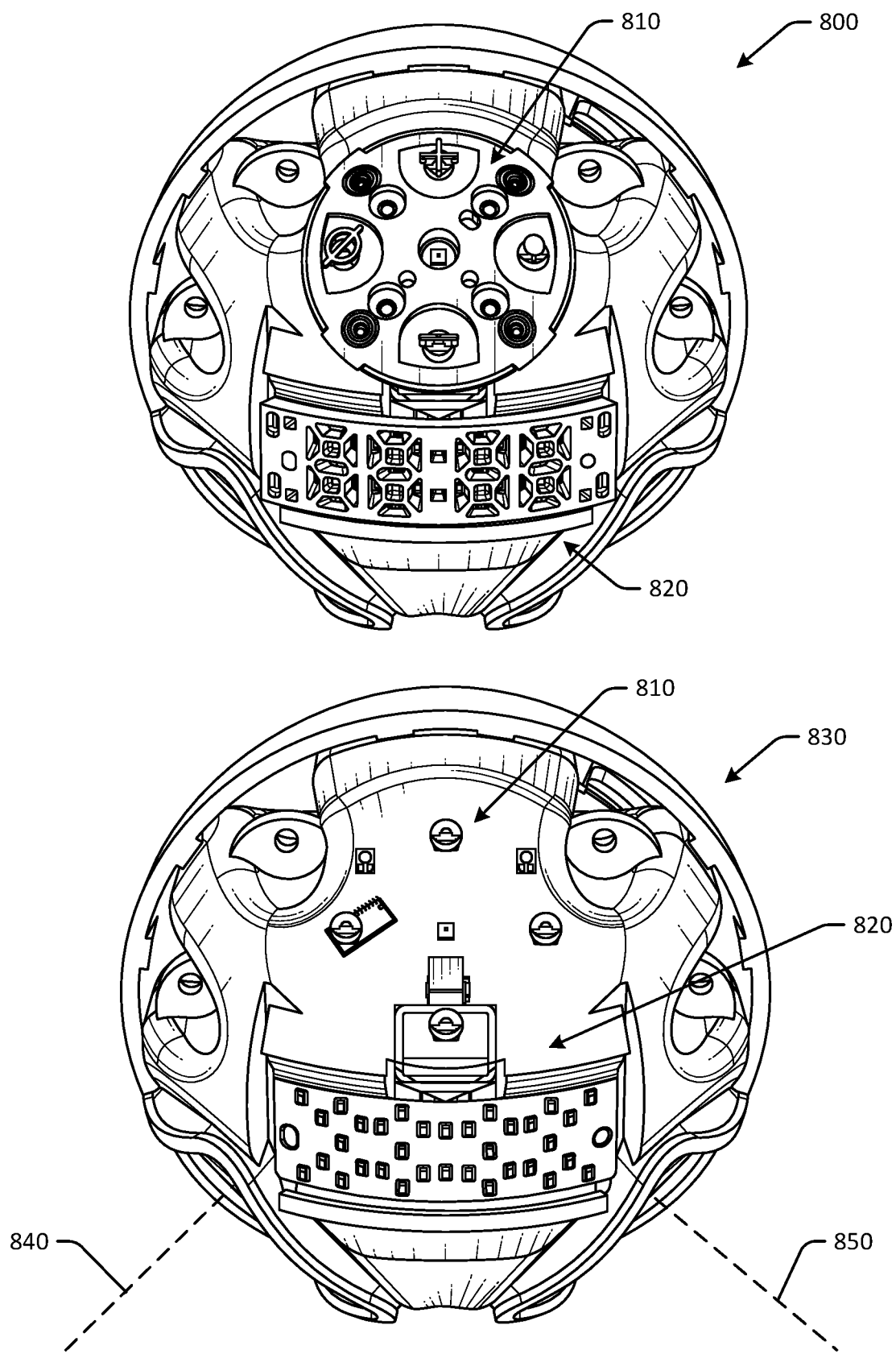

FIG. 8 is a schematic drawing of a voice activated device 800 in a top view and a front perspective view 830 without an upper portion in accordance with one or more embodiments of the disclosure. The voice activated device may be the same or different than the voice activated device of FIG. 7. Other embodiments may include additional or fewer, and/or different, components.

In FIG. 8, the voice activated device 800 may include a button assembly 810 disposed adjacent to an optional clock 820. The button assembly 810 may be disposed adjacent to a microphone board 840. The microphone board 840 may include at least one microphone, at least one LED, and/or an ambient light sensor. The microphone board 840 may be disposed adjacent to the upper portion of the housing. The first speaker may have a first central axis 840 extending through a center of the magnet of the first speaker, and the second speaker may have a second central axis 850 extending through a center of the magnet of the second speaker. The angular distance between the first central axis 840 and the second central axis 850 may be between about 45 degrees and about 180 degrees.

Figure 9:
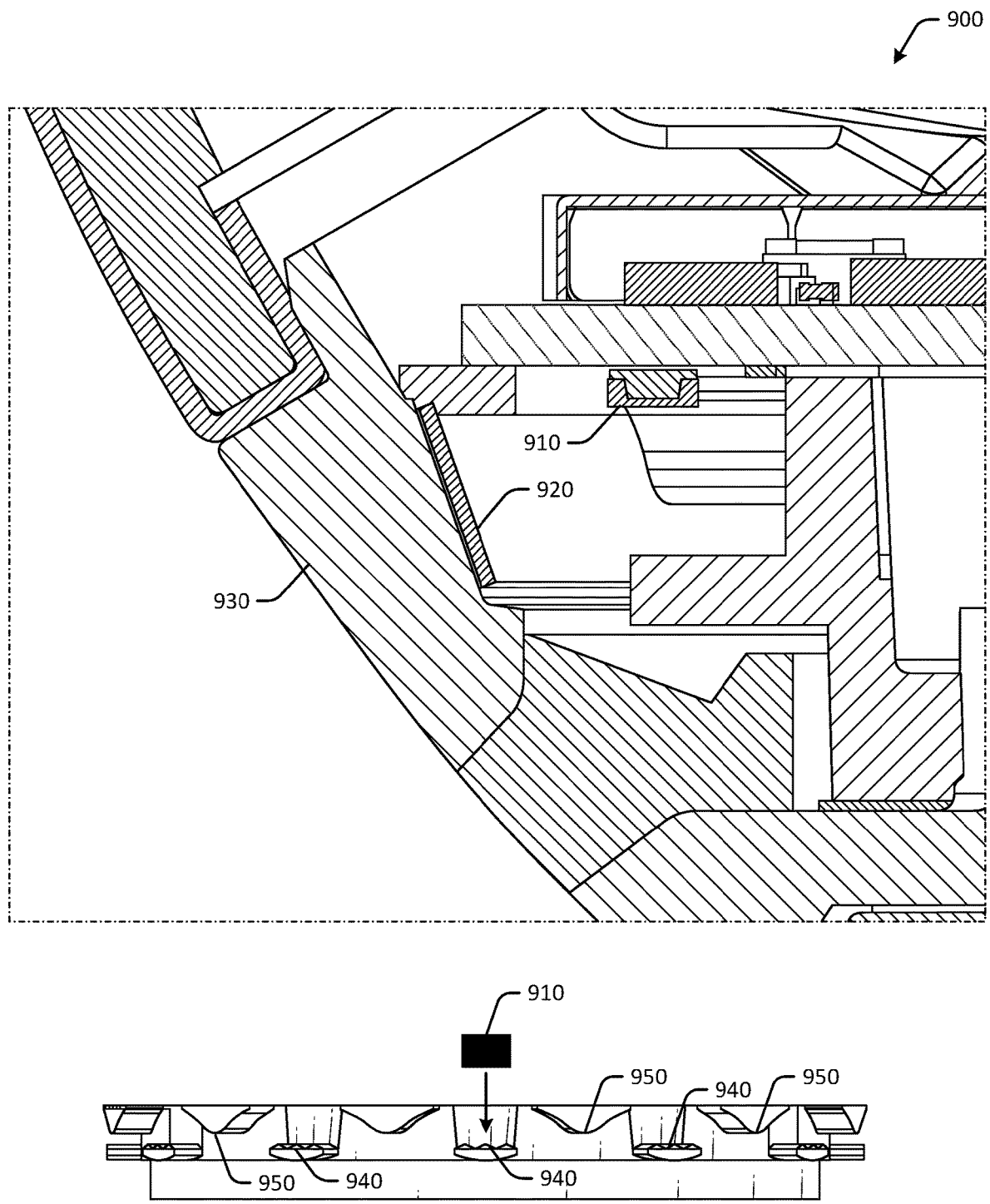
FIG. 9 is a schematic drawing of a reflector assembly of a voice activated device in a cross-sectional view in accordance with one or more embodiments of the disclosure.

FIG. 9 is a schematic drawing of a reflector assembly 900 of a voice activated device in a cross-sectional view in accordance with one or more embodiments of the disclosure. The reflector assembly may be the same or different than the reflector assembly described in FIGS. 1A-8. Other embodiments may include additional or fewer, and/or different, components.

In FIG. 9, the reflector assembly 900 may include a reflector component 920 that may have a reflective coating, such as a white paint, film, plastic, ink, or other reflective coating, along one or more surfaces, so as to reflect light emitted from LEDs 910 through a light ring 930. Light emitted from the LEDs 910 may be reflected from the reflector component 920 and may propagate through the light ring 930. The reflector component 920 may include a set of sharp features 940 and soft features 950 disposed about a perimeter of the light reflector component. For example, sharp features may be triangular features, sharply angled saw teeth, or other features that are disposed adjacent to the LED 910, so as to scatter light as it is emitted from the LED 910. The soft features may be curved features with gradual curves and may scatter less light than the sharp features. The soft features may be disposed between sharp features, so as to increase uniformity of light propagating through the light ring 930. The light ring 930 may form a portion of an outer surface of the voice activated device, such that light emitted from the LEDs 910 reflects from the reflector component 920 and is visible through the light ring 930. Although illustrated as alternating, the sharp features 940 may be aligned with a central axis of light emitted by LEDs 910, and the soft features 950 may be disposed adjacent to the sharp features 940. In other embodiments, the features may not be interspersed or alternating, and may instead be arranged based on the placement of the LEDs 910.

The light ring of the voice activated device may be configured to indicate a location of sound detected by the voice activated device. For example, if a microphone of the voice activated device detects sound or voice coming from a left side of the voice activated device, one or more LEDs on the left side of the voice activated device may be caused to illuminate, so as to indicate to a user that sound is being detected from the left side of the voice activated device. The light ring may dynamically modify LEDs that are illuminated while sound or voice is detected, and may also be used to visually communicate information to a user. For example, during processing, the light ring may have a certain illumination status, while the device is muted, the light ring may have a different illumination status, and so forth.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 10:
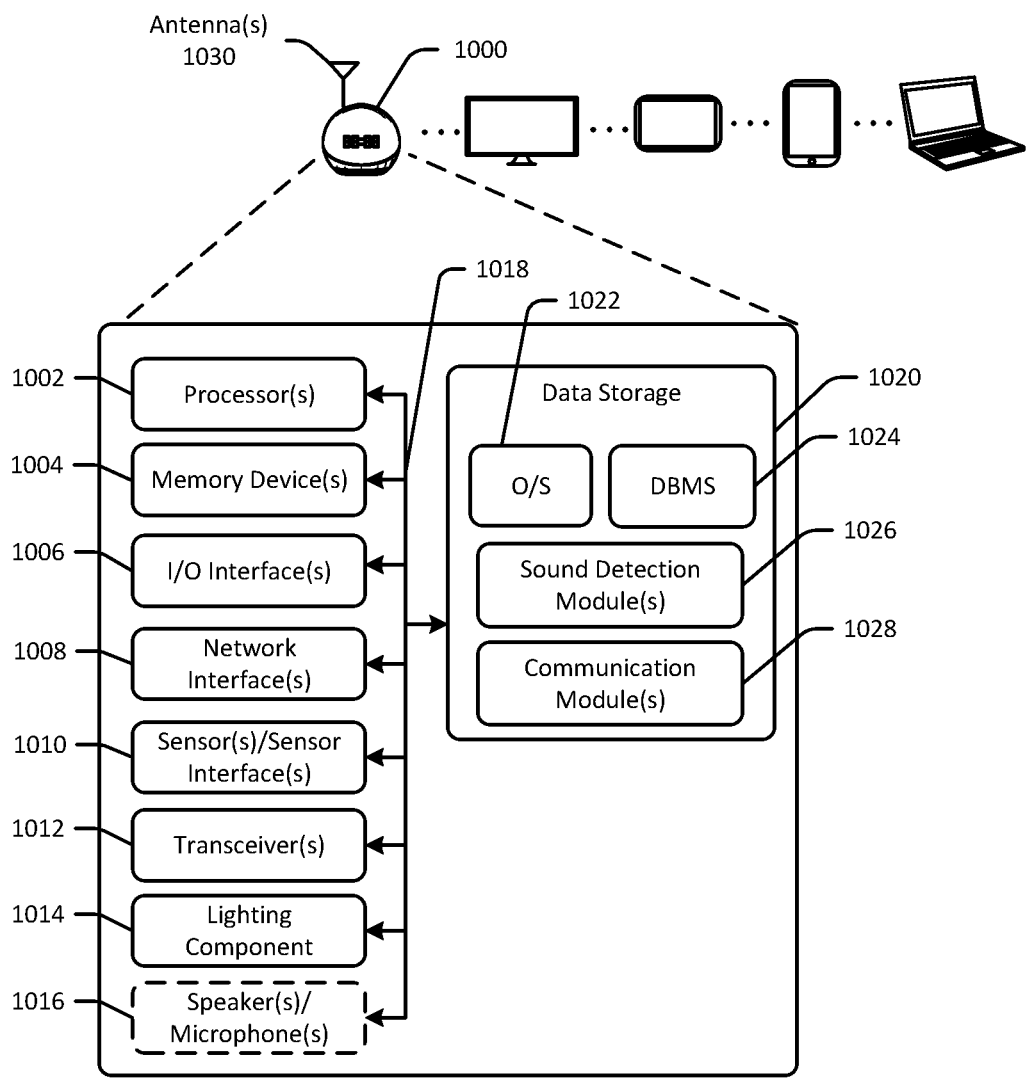
FIG. 10 schematically illustrates an example architecture of a voice activated device with integrated heatsink and speaker in accordance with one or more embodiments of the disclosure.

FIG. 10 is a schematic block diagram of one or more illustrative voice activated device(s) 1000 in accordance with one or more example embodiments of the disclosure. The voice activated device(s) 1000 may include any suitable computing device with a light bar component with or without a display, in some instances, including, but not limited to, a server system, a mobile device such as a smartphone, a tablet, an e-reader, a wearable device, or the like; a desktop computer; a laptop computer; a content streaming device; a set-top box; a scanning device; a speaker device; or the like. The voice activated device(s) 1000 may correspond to an illustrative device configuration for the voice activated device of FIGS. 1A-9.

The voice activated device(s) 1000 may be configured to communicate with one or more servers, user devices, or the like. The voice activated device(s) 1000 may be configured to determine voice commands, determine wakeword utterances, determine and/or control other devices, and other operations. The voice activated device(s) 1000 may be configured to emit light, detect sound, output digital content, and other functionality. In some embodiments, a single remote server or a single group of remote servers may be configured to perform more than one type of functionality in conjunction with a voice activated device.

The voice activated device(s) 1000 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the voice activated device(s) 1000 may include one or more processors (processor(s)) 1002, one or more memory devices 1004 (also referred to herein as memory 1004), one or more input/output (I/O) interface(s) 1006, one or more network interface(s) 1008, one or more sensor(s) or sensor interface(s) 1010, one or more transceiver(s) 1012, one or more lighting components 1014, and one or more optional camera(s)/microphone(s) 1016, and data storage 1020. The voice activated device(s) 1000 may further include one or more bus(es) 1018 that functionally couple various components of the voice activated device(s) 1000. The voice activated device(s) 1000 may further include one or more antenna(s) 1030 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1018 may include at least one of a system bus, a memory bus, an address bus, or a message bus, and may permit the exchange of information (e.g., data (including computer-executable code), signaling, etc.) between various components of the voice activated device(s) 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1004 of the voice activated device(s) 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to the memory 1004 for use by the processor(s) 1002 during the execution of the computer-executable instructions. Moreover, output data generated as a result of execution of the computer-executable instructions by the processor(s) 1002 may be stored initially in the memory 1004, and may ultimately be copied to the data storage 1020 for non-volatile storage.

More specifically, the data storage 1020 may store one or more operating systems (O/S) 1022; one or more database management systems (DBMS) 1024; and one or more program module(s), applications, engines, computer-executable code, scripts, or the like such as, for example, one or more sound detection module(s) 1026 and/or one or more communication module(s) 1028. Some or all of these module(s) may be sub-module(s). Any of the components depicted as being stored in the data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in the data storage 1020 may support functionality described in reference to corresponding components named earlier in this disclosure.

The data storage 1020 may further store various types of data utilized by the components of the voice activated device(s) 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, an example datastore(s) may include, for example, historical data for previously identified utterances, speaker identification or profile information, and/or other information.

The processor(s) 1002 may be configured to access the memory 1004 and execute the computer-executable instructions loaded therein. For example, the processor(s) 1002 may be configured to execute the computer-executable instructions of the various program module(s), applications, engines, or the like of the voice activated device(s) 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the sound detection module(s) 1026 may include computer-executable instructions, code, or the like that responsive to execution by one or more of the processor(s) 1002 may perform functions including, but not limited to, detect sound, determine sound meanings, generate audio signals and audio data, determine a location of sound, determining a light bar illumination status, determining which LEDs to illuminate, causing a change in illumination status, and the like.

The communication module(s) 1028 may include computer-executable instructions, code, or the like that responsive to execution by one or more of the processor(s) 1002 may perform functions including, but not limited to, sending and/or receiving data, including content, sending and/or receiving instructions and commands, and the like.

Referring now to other illustrative components depicted as being stored in the data storage 1020, the O/S 1022 may be loaded from the data storage 1020 into the memory 1004 and may provide an interface between other application software executing on the voice activated device(s) 1000 and the hardware resources of the voice activated device(s) 1000. More specifically, the O/S 1022 may include a set of computer-executable instructions for managing the hardware resources of the voice activated device(s) 1000 and for providing common services to other application programs (e.g., managing memory allocation among various application programs). In certain example embodiments, the O/S 1022 may control execution of the other program module(s). The O/S 1022 may include any operating system now known or which may be developed in the future including, but not limited to, any server operating system, any mainframe operating system, or any other proprietary or non-proprietary operating system.

The DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the voice activated device(s) 1000 is a mobile device, the DBMS 1024 may be any suitable lightweight DBMS optimized for performance on a mobile device.

Referring now to other illustrative components of the voice activated device(s) 1000, the input/output (I/O) interface(s) 1006 may facilitate the receipt of input information by the voice activated device(s) 1000 from one or more I/O devices as well as the output of information from the voice activated device(s) 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the voice activated device(s) 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(s) 1030 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, a LoRa (long range) network, etc.

The voice activated device(s) 1000 may further include one or more network interface(s) 1008 via which the voice activated device(s) 1000 may communicate with any of a variety of other systems, platforms, networks, devices, and so forth. The network interface(s) 1008 may enable communication, for example, with one or more wireless routers, one or more host servers, one or more web servers, and the like via one or more networks.

The antenna(s) 1030 may include any suitable type of antenna depending, for example, on the communications protocols used to transmit or receive signals via the antenna(s) 1030. Non-limiting examples of suitable antennas may include directional antennas, non-directional antennas, dipole antennas, folded dipole antennas, patch antennas, multiple-input multiple-output (MIMO) antennas, or the like. The antenna(s) 1030 may be communicatively coupled to one or more transceivers 1012 or radio components to which or from which signals may be transmitted or received.

As previously described, the antenna(s) 1030 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 1030 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 1030 may be configured to transmit or receive radio frequency signals within any suitable frequency range forming part of the unlicensed portion of the radio spectrum.

The antenna(s) 1030 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(s) 1030—transmitting or receiving radio frequency (RF) signals in the bandwidth and/or channels corresponding to the communications protocols utilized by the voice activated device(s) 1000 to communicate with other devices. The transceiver(s) 1012 may include hardware, software, and/or firmware for modulating, transmitting, or receiving—potentially in cooperation with any of antenna(s) 1030—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the voice activated device(s) 1000. The transceiver(s) 1012 may further include a low noise amplifier (LNA), additional signal amplifiers, an analog-to-digital (A/D) converter, one or more buffers, a digital baseband, or the like.

The sensor(s)/sensor interface(s) 1010 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The linear lighting element(s) 1014 may include one or more LEDs that may be illuminated responsive to detected sound and may be in a linear configuration. The optional camera(s) 1016 may be any device configured to capture ambient light or images. The optional microphone(s) 1016 may be any device configured to receive analog sound input or voice data.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the voice activated device(s) 1000, and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the voice activated device(s) 1000 may include alternate and/or additional hardware, software, or firmware components beyond those described or depicted without departing from the scope of the disclosure. More particularly, it should be appreciated that software, firmware, or hardware components depicted as forming part of the voice activated device(s) 1000 are merely illustrative and that some components may not be present or additional components may be provided in various embodiments. While various illustrative program module(s) have been depicted and described as software module(s) stored in the data storage 1020, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1A-9 may be performed by a device having the illustrative configuration depicted in FIG. 10, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1A-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1A-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A voice activated device comprising:
   a spherical housing comprising a top portion and a bottom portion;
   a microphone board disposed adjacent to the top portion, the microphone board comprising an ambient light sensor, a red light emitting diode (LED), and a plurality of microphones arranged in an array and aligned with microphone holes in the top portion;
   a button assembly coupled to the top portion, the button assembly comprising a first translucent button and a first light pipe disposed between the first translucent button and the ambient light sensor;
   an integrated speaker and heatsink assembly comprising:
      a speaker housing;
      a heatsink coupled to a bottom side of the speaker housing, wherein the heatsink and the speaker housing together define a sealed chamber that provides air for a speaker back volume; and
      a first speaker coupled to the speaker housing opposite the heatsink and configured to output sound at a first angle upwards towards the top portion and away from the heatsink and the sealed chamber;
   a main logic board coupled to a first side of the bottom portion, the main logic board comprising a set of LEDs configured to emit light;
   a reflector component disposed between the main logic board and the bottom portion, the reflector component configured to reflect light emitted by the LEDs; and
   a circular light ring disposed about a lower end of the bottom portion, such that light emitted from the set of LEDs is visible through the circular light ring.

2. The voice activated device of claim 1, wherein the button assembly further comprises:
   a second translucent button; and
   a second light pipe disposed between the second translucent button and the red LED, the second light pipe configured to guide light emitted by the red LED to the second translucent button.

3. The voice activated device of claim 1, further comprising:
   a fabric covering disposed about the top portion, wherein ambient light is transmissible through at least a portion of the fabric covering; and
   a light guide component disposed between the portion of the fabric covering and the ambient light sensor, the light guide component configured to guide ambient light to the ambient light sensor via the portion of the fabric covering.

4. The voice activated device of claim 1, wherein the integrated speaker and heatsink assembly further comprises:
   a second speaker coupled to the speaker housing and disposed adjacent to the first speaker, the second speaker configured to output sound at the first angle upwards towards the top portion;
   wherein an angle between a first central axis of the first speaker and a second central axis of the second speaker is between about 60 degrees and about 180 degrees, and wherein the first angle is between about 2 degrees and about 20 degrees.

5. A voice activated device comprising:
   a housing having an upper portion and a lower portion;
   a speaker housing;
   an ambient light sensor;
   a first button;
   a first light guide component disposed between the first button and the ambient light sensor;
   a heatsink coupled to a bottom side of the speaker housing, wherein the heatsink and the speaker housing together form a sealed chamber that provides air for a speaker back volume;
   a first speaker coupled to the speaker housing opposite the heatsink and partially disposed within the sealed chamber, wherein the first speaker is oriented to output audio towards the upper portion of the housing and away from the heatsink and the sealed chamber; and
   a light ring disposed about the lower portion of the housing.

6. The voice activated device of claim 5, further comprising:
   an LED clock assembly coupled to the upper portion of the housing.

7. The voice activated device of claim 6, wherein the LED clock assembly is disposed at a side of the housing and is positioned a first distance from the light ring, and wherein the first speaker is positioned a second distance from the light ring, wherein the second distance is greater than the first distance.

8. The voice activated device of claim 5, further comprising:
a circuit board disposed adjacent to the lower portion, the circuit board comprising a plurality of light emitting diodes (LEDs); and
a light reflector component disposed adjacent to the circuit board.

9. The voice activated device of claim 8, wherein the light reflector component comprises a set of triangular features and curved features disposed about a perimeter of the light reflector component, and wherein the light ring forms a portion of an outer surface of the voice activated device, such that light emitted from the LEDs reflects from the light reflector component and is visible through the light ring.

10. The voice activated device of claim 5, further comprising:
a microphone board comprising at least one microphone, at least one LED, and the ambient light sensor;
wherein the microphone board is disposed adjacent to the upper portion of the housing.

11. The voice activated device of claim 10, further comprising:
a second button; and
a second light guide component disposed between the second button and the at least one LED.

12. The voice activated device of claim 5, further comprising:
a second speaker coupled to the speaker housing, wherein the first speaker is oriented along a first axis and the second speaker is oriented along a second axis; and
wherein an angular distance between the first axis and the second axis is between about 60 degrees and about 180 degrees.

13. The voice activated device of claim 12, wherein the first speaker and the second speaker are oriented upwards at an angle of between about 5 degrees and about 65 degrees relative to a horizontal axis.

14. The voice activated device of claim 5, further comprising:
a fabric cover disposed at least partially over the upper portion;
wherein the upper portion has a hemispherical geometry, and wherein the voice activated device has a substantially spherical geometry.

15. The voice activated device of claim 13, further comprising:
a second light guide component extending between a portion of the fabric cover.

16. A device comprising:
a microphone;
a housing having a top portion and a bottom portion;
an ambient light sensor;
a first button;
a first light guide component disposed between the first button and the ambient light sensor;
an LED clock assembly;
a light ring component disposed along an outer surface of the bottom portion of the device;
a plurality of LEDs positioned adjacent to the light ring component;
a speaker housing;
a heatsink coupled to a bottom side of the speaker housing, wherein the heatsink and the speaker housing together form a sealed chamber that provides air for a speaker back volume; and
a first speaker coupled to the speaker housing opposite the heatsink and partially disposed within the sealed chamber,
wherein the first speaker is oriented to output audio towards the top portion of the housing and away from the heatsink and the sealed chamber, and
wherein the device has a substantially spherical geometry.

17. The device of claim 16, further comprising:
a fabric cover;
wherein the top portion has a hemispherical geometry.

18. The device of claim 16, wherein the LED clock assembly is disposed at a side of the housing, and is positioned closer to the light ring component than the first speaker.

19. The device of claim 16, further comprising:
a light reflector component disposed adjacent to an inner portion of the light ring component, the light reflector component comprising a set of triangular features and curved features disposed about a perimeter of the light reflector component.

* * * * *